(12) United States Patent
Masuda et al.

(10) Patent No.: US 8,327,629 B2
(45) Date of Patent: Dec. 11, 2012

(54) BLACK EXHAUST PURIFICATION APPARATUS FOR DIESEL ENGINE

(75) Inventors: Hiroki Masuda, Osaka (JP); Hiroshi Masuda, Osaka (JP); Hiroshi Omote, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 453 days.

(21) Appl. No.: 12/532,273

(22) PCT Filed: Apr. 2, 2008

(86) PCT No.: PCT/JP2008/056604
§ 371 (c)(1),
(2), (4) Date: Sep. 21, 2009

(87) PCT Pub. No.: WO2008/120802
PCT Pub. Date: Oct. 9, 2008

(65) Prior Publication Data
US 2010/0107613 A1    May 6, 2010

(30) Foreign Application Priority Data
Apr. 3, 2007   (JP) .................................. 2007-97710

(51) Int. Cl.
*F01N 3/00* (2006.01)
*F01N 3/02* (2006.01)
*F01N 3/10* (2006.01)

(52) U.S. Cl. ............... 60/296; 60/297; 60/300; 60/303; 60/311

(58) Field of Classification Search ............ 60/286, 60/295, 297, 299, 301, 296
See application file for complete search history.

(56) References Cited

U.S. PATENT DOCUMENTS

| | | | | | |
|---|---|---|---|---|---|
| 3,132,473 | A | * | 5/1964 | Hass | 60/274 |
| 3,421,315 | A | * | 1/1969 | Aoi | 60/297 |
| 3,688,476 | A | * | 9/1972 | Lenane | 96/380 |
| 3,999,967 | A | * | 12/1976 | Aoi | 96/397 |
| 4,167,852 | A | * | 9/1979 | Ludecke | 60/296 |
| 4,386,497 | A | * | 6/1983 | Takagi et al. | 60/296 |
| 4,541,240 | A | | 9/1985 | Munro | 60/295 |
| 4,858,431 | A | * | 8/1989 | Leonhard et al. | 60/297 |
| 4,878,928 | A | * | 11/1989 | Wagner et al. | 55/466 |
| 5,212,948 | A | * | 5/1993 | Gillingham et al. | 60/288 |

(Continued)

FOREIGN PATENT DOCUMENTS

EP          0 931 913 A2     1/1999

(Continued)

OTHER PUBLICATIONS

Machine Translation JP09-125932.*

(Continued)

*Primary Examiner* — Kenneth Bomberg
*Assistant Examiner* — Dapinder Singh
(74) *Attorney, Agent, or Firm* — Sterne, Kessler, Goldstein & Fox P.L.L.C.

(57) ABSTRACT

It is an object of the present invention to provide a black smoke exhaust purification apparatus capable of equalizing temperature of a particulate filter and facilitating maintenance thereof. The black smoke exhaust purification apparatus is arranged in series therein with an oxidation catalyst and a particulate filter wherein an inlet for exhaust gas is disposed between the oxidation catalyst and the particulate filter, and wherein an exhaust gas passage is extended from the inlet portion through the oxidation catalyst so as to be connected to an upstream space of the oxidation catalyst.

4 Claims, 14 Drawing Sheets

U.S. PATENT DOCUMENTS

| | | | |
|---|---|---|---|
| 5,685,143 A * | 11/1997 | Aitta et al. | 60/274 |
| 5,890,361 A * | 4/1999 | Brown et al. | 60/288 |
| 6,823,665 B2 * | 11/2004 | Hirota et al. | 60/296 |
| 7,247,185 B2 * | 7/2007 | Jobson et al. | 55/523 |
| 7,384,612 B2 * | 6/2008 | Ajisaka et al. | 422/177 |
| 7,549,286 B2 * | 6/2009 | Matsunami et al. | 60/297 |
| 7,900,443 B2 * | 3/2011 | Stieglbauer | 60/297 |
| 2005/0147541 A1 * | 7/2005 | Ajisaka et al. | 422/177 |
| 2008/0229732 A1 * | 9/2008 | Matsunami et al. | 60/299 |

FOREIGN PATENT DOCUMENTS

| | | |
|---|---|---|
| EP | 1 353 047 A1 | 10/2003 |
| GB | 2 381 220 A | 4/2003 |
| JP | 05-237397 | 9/1993 |
| JP | 8-507346 | 8/1996 |
| JP | 09-125932 A | 5/1997 |
| JP | 2000-510215 | 8/2000 |
| JP | 2002-285821 A | 10/2002 |
| JP | 2003-049634 | 2/2003 |
| JP | 2003-097248 A | 4/2003 |
| JP | 2003-120260 | 4/2003 |
| JP | 2003-120277 | 4/2003 |
| JP | 2003-148141 | 5/2003 |
| JP | 2005-016374 | 1/2005 |
| JP | 2006-007100 | 1/2006 |
| JP | 2006-016991 | 1/2006 |
| JP | 2006-057551 | 3/2006 |
| JP | 2006-088027 | 4/2006 |
| WO | WO 2005/059324 A1 | 6/2005 |

OTHER PUBLICATIONS

Machine Translation JP09-125932. Date: Dec. 12, 2011.*
English translation of Notification of Reasons for Refusal issued in connection with JP Application No. 2007-097710, Japanese Patent Office, mailed Oct. 25, 2011, 3 pages.
Extended European Search Report for EP Application No. 08739714.7, European Patent Office, mailed May 17, 2011, 6 pages.
International Search Report for International Application No. PCT/JP2008/056604, mailed May 1, 2008, 2 pgs.
English translation of the Notification of the First Action for CN Application No. 200880010333.5, issued Aug. 10, 2011, State Intellectual Property Office of People's Republic of China, 4 pages.

* cited by examiner

BLACK EXHAUST PURIFICATION APPARATUS FOR DIESEL ENGINE

BACKGROUND OF THE INVENTION

1. Field of the Invention

The present invention relates to a black smoke exhaust purification apparatus for a diesel engine.

2. Related Art

A conventional exhaust after treatment device (a black smoke exhaust purification apparatus) is suggested for use in an automobile and is arranged in series thereon in order of an exhaust inlet (a heater), an oxidation catalyst and a particulate filter (see FIG. 13). A temperature of the particulate filter needs to be increased so as to regenerate the particulate filter and is mainly increased due to heat caused by exhaust gas. The oxidation catalyst also play a role in increasing the temperature of the particulate filter by obtaining oxidative heat from CO or HC soon after the particulate filter accompanying purifications of them. The particulate filter is made of a ceramic, and there is a possibility that a crack is caused due to the temperature difference in the particulate filter when exhaust gas is concentrated at one site. Various structures are suggested so as to equalize the temperatures in the particulate filter in response to the problem (for example, see Patent Literatures 1, 2, 3 and 4).

In general, the exhaust inlet is provided with a space at the opposite side of the particulate filter over the oxidation catalyst (a space at the upstream side of the oxidation catalyst) so that exhaust gas directly enters from the exhaust inlet. With regard to an exhaust outlet, a device which the particulate filter is provided on the outer periphery thereof with a space through which exhaust gas is discharged, is suggested so as to keep the outer side of the particulate filter warm (for example, see Patent Literature 5.) But in many of the devices, exhaust gas is discharged directly, or via a resonant chamber and the like, from a space on the side of the particulate filter.

In case of an industrial engine, since the exhaust after treatment device is installed in various forms and a space in a mounted portion is limited, there are various shapes of mufflers. Especially, exhaust gas enters from the side surface portion of the muffler in many of the engines. Also, with regard to the industrial engine, for example, an application in which a filter case having a sound deadening performance is installed at the present muffler placement instead of the muffler, is filed (for example, Patent Literatures 1 and 6).

Patent Literature 1: the Japanese Patent Laid Open Gazette 2005-16374
Patent Literature 2: the Japanese Patent Laid Open Gazette 2006-7100
Patent Literature 3: the Japanese Patent Laid Open Gazette 2006-16991
Patent Literature 4: the Japanese Patent Laid Open Gazette 2006-88027
Patent Literature 5: the Japanese Patent Laid Open Gazette 2003-49634
Patent Literature 6: the Japanese Patent Laid Open Gazette 2003-120277

SUMMARY OF THE INVENTION

Problems to be Solved by the Invention

In case of the industrial engine, the engine was mounted in various forms, and the conventional mufflers had various shapes of exhaust inlets. For this reason, when the filter as the after treatment device is installed instead of the muffler, there is a problem that it cannot be installed in the shape for automobile use. As shown in FIG. 14, especially, an exhaust inlet 100 is provided in the vicinity of the middle portion of a filter case having a resonant chamber 35, a first expanding chamber 101 and a second expanding chamber 102, and the after treatment device having the above-mentioned configuration is constitutionally desirable. When the resonant chamber is disposed at the exhaust inlet portion, and the oxidation catalyst carrier and the particulate filter are arranged in this order, the exhaust inlet can be provided in the vicinity of the middle portion of the filter case. However, as thermal capacity from the exhaust inlet to the oxidation catalyst needs to be reduced as much as possible so as to increase the exhaust gas temperature, it is not preferable that the resonant chamber is disposed on the side of the exhaust inlet.

A variety of structures are proposed so as to equalize the temperatures of the particulate filter, but in case of the industrial engine, the original exhaust gas is sometimes discharged at very high temperatures and the heat concentration is caused at the central portion of the filter due to heat dissipation when exhaust gas equally flows, thereby leading to a problem that the temperatures of the filter are not equalized. With respect to the particulate filter, only the particulate filter needs to be removed to sweep undecomposed ashes. When the filter is removed together with the case from a joint of an exhaust pipe, the particulate filter needs to be further removed for exchanging a gasket or from the case having many removable parts, thereby requiring much time and causing a problem due to maintenance.

In consideration of the above-described problems, it's an object of the present invention to provide a black smoke exhaust purification apparatus for a diesel engine that can equalize the temperatures of the particulate filter and that can easily perform the maintenance thereof.

DISCLOSURE OF INVENTION

Means for Solving the Problem

The problem to be solved by the present invention is as mentioned above. Next, the means for solving the problem will be described.

In a black smoke exhaust purification apparatus for a diesel engine of the present invention in which an oxidation catalyst and a particulate filter are arranged in series and in which the particulate filter is arranged in the direction where the oxidation catalyst discharges exhaust gas so that a direction introducing exhaust gas of the particulate filter corresponds to the one discharging exhaust gas of the oxidation catalyst. The black smoke exhaust purification apparatus comprises an inlet for exhaust gas or an outlet for exhaust gas between an end surface at the upstream side of the oxidation catalyst and an end surface at the downstream side of the particulate filter, wherein exhaust gas introduced from the inlet for exhaust gas is supplied from the oxidation catalyst to the particulate filter and is discharged to the outlet for exhaust gas.

In the black smoke exhaust purification apparatus for the diesel engine of the present invention, in which an oxidation catalyst and a particulate filter are arranged in series, the inlet for exhaust gas is provided between the oxidation catalyst and the particulate filter and an exhaust gas passage is extended from the inlet through the oxidation catalyst so as to be connected to the upstream space of the oxidation catalyst.

In the black smoke exhaust purification apparatus for the diesel engine of the present invention, in which an oxidation catalyst and a particulate filter are arranged in series, the inlet for exhaust gas is provided between the oxidation catalyst and the particulate filter and the exhaust gas passage is extended from the inlet and is approximately air-tightly connected to a central portion of the downstream end surface of the oxidation catalyst.

In the black smoke exhaust purification apparatus for the diesel engine of the present invention, in which an oxidation catalyst and a particulate filter are arranged in series, a convex exhaust gas introducing portion is provided at the upstream space of the oxidation catalyst.

In the black smoke exhaust purification apparatus for the diesel engine of the present invention, in which an oxidation catalyst and a particulate filter are arranged in series, the oxidation catalyst is provided at the outer peripheral portion and at the upstream side thereof with spaces wherein an inlet pipe for exhaust gas is continuously connected to the outer peripheral portion space and an inlet portion of the inlet pipe is provided so as not to approach the upstream space of the oxidation catalyst so that exhaust gas is introduced into the upstream space of the oxidation catalyst through the outer peripheral portion space of the oxidation catalyst.

In the black smoke exhaust purification apparatus for the diesel engine of the present invention, in which an oxidation catalyst and a particulate filter are arranged in series, the inlet for exhaust gas is interposed between the oxidation catalyst and the particulate filter. The oxidation catalyst is provided at the outer peripheral portion, the upstream side and the downstream side thereof with spaces, wherein the inlet pipe extended from the inlet portion is projected into the downstream space of the oxidation catalyst and the inlet pipe is continuously connected at the middle portion and the end portion thereof to the outer peripheral portion space of the oxidation catalyst so as to introduce exhaust gas to the upstream space through the outer peripheral portion space of the oxidation catalyst.

In the present invention, a guide is provided so that exhaust gas introduced to the upstream space of the oxidation catalyst does not unevenly flow to the central side of the oxidation catalyst.

In the present invention, an outlet for exhaust gas is interposed between the oxidation catalyst and the particulate filter and an exhaust gas passage is extended from the outlet portion of exhaust gas through the particulate filter so as to be connected to the downstream space of the particulate filter.

In the present invention, the particulate filter is provided at the outer peripheral portion and the downstream side thereof with spaces and the outlet pipe for exhaust gas is continuously connected to the outer peripheral portion space, whereby exhaust gas is introduced from the downstream space of the particulate filter through the outer peripheral portion space of the particulate filter to the outlet for exhaust gas.

In the present invention, the particulate filter is provided at the outer peripheral portion thereof with a space, which is provided thereon with the resonant chamber for deadening an exhaust sound.

In the present invention, the oxidation catalyst is provided at the outer peripheral portion and the upstream space thereof with an exhaust heater.

In the present invention, the black smoke exhaust purification apparatus for the diesel engine is provided at the rear portion thereof with a cover portion, and the particulate filter is removable without removing a flange at a gateway for exhaust gas.

In the present invention, the black smoke exhaust purification apparatus for the diesel engine is provided at the front portion thereof with a cover portion, and the exhaust heater is removable without removing a flange at a gateway for exhaust gas.

Effect of the Invention

As effects of the present invention, the following effects can be achieved.

According to the present invention, the temperatures of the particulate filter can be equalized and the maintenance thereof can be easily performed, and an entire length of the black smoke exhaust purification apparatus for the diesel engine can be compacted.

According to the present invention, as exhaust gas is discharged from the outer peripheral portion of the oxidation catalyst carrier disposed forward of the filter, a relatively larger amount of exhaust gas flows to the outer peripheral portion of the particulate filter and temperatures of the particulate filter are equalized. The exhaust gas inlet can be provided at center of side of the casing (the whole apparatus) so that a mounting performance for the black smoke exhaust purification apparatus (the after treatment device) is improved.

According to the present invention, as exhaust gas is discharged from the outer peripheral portion of the oxidation catalyst carrier disposed forward of the filter, relatively more exhaust gas flows to the outer peripheral portion of the particulate filter and the temperatures of the particulate filter are equalized. The exhaust gas inlet can be provided at center of side of the casing (the whole apparatus) so that a mounting performance for the black smoke exhaust purification apparatus (the after treatment device) is improved. Moreover, the time when the exhaust gas passes through the oxidation catalyst carrier becomes larger, thereby assuredly enabling oxidation of the CO and the HC.

According to the present invention, as the guide is provided so that exhaust gas is certainly introduced to the outer side of the oxidation catalyst, exhaust gas is discharged from the outer peripheral portion of the oxidation catalyst carrier disposed forward of the filter. Consequently, relatively more exhaust gas flows to the outer peripheral portion of the particulate filter, thereby equalizing the temperature of the particulate filter.

According to the present invention, exhaust gas can be approximately equally introduced to the oxidation catalyst. As a result, since exhaust gas is discharged from the outer peripheral portion of the oxidation catalyst carrier disposed forward of the particulate filter, relatively more exhaust gas flows to the outer peripheral portion of the particulate filter, thereby equalizing the temperature of the particulate filter. The exhaust gas inlet can be provided at center of side of the casing (the whole apparatus) so that a mounting performance for the black smoke exhaust purification apparatus (the after treatment device) is improved.

According to the present invention, the inlet pipe penetrated in the apparatus body for introducing exhaust gas is constructed so as to be located at the downstream of the oxidation catalyst disposed forward of the filter, thereby preventing exhaust gas flowing from the outer peripheral portion of the oxidation catalyst to the upstream space from flowing into the central portion of the oxidation catalyst inlet, so as to further equalize exhaust gas distribution in the oxidation catalyst inlet. The apparatus body is penetrated and supported by the inlet pipe, thereby improving the intensity of the whole apparatus.

According to the present invention, since exhaust gas is approximately equally introduced from the outer peripheral portion of the oxidation catalyst to the oxidation catalyst inlet, exhaust gas is introduced from the outer peripheral portion of the oxidation catalyst carrier, and relatively more exhaust gas flows to the outer peripheral portion of the particulate filter, thereby equalizing the temperature of the particulate filter. The exhaust gas inlet can be provided at center of side of the casing (the apparatus body) so that a mounting performance for the black smoke exhaust purification apparatus (the after treatment device) is improved.

According to the present invention, as the particulate filter is formed as a torus-shape so as to omit the central portion where the heat is easy to be concentrated, the filter temperatures are equalized. The exhaust gas outlet can be provided at center of side of the casing (the apparatus body) so that a mounting performance for the black smoke exhaust purification apparatus (the after treatment device) is improved.

According to the present invention, relatively more exhaust gas flows to the outer peripheral portion of the particulate filter, thereby equalizing the temperature of the particulate filter. The exhaust gas outlet can be provided at center of side of the casing (the apparatus body) so that a mounting performance for the black smoke exhaust purification apparatus (the after treatment device) is improved.

According to the present invention, the particulate filter is provided at the outside thereof with the space, which is provided thereon with the resonant chamber for deadening the exhaust sound, whereby the resonant chamber can be provided without loss of the apparatus in the length direction and the particulate filter can serve as the silencer.

According to the present invention, when the exhaust temperature is not enough to regenerate the particulate filter, the exhaust gas temperature can be increased using the exhaust heater. The exhaust heater can be attached to the relatively larger area at the outer peripheral portion, and a capacious heater can be installed.

According to the present invention, the particulate filter is removable without removing the flange of the exhaust gateway, thereby facilitating the maintenance in case of ash deposition.

According to the present invention, the exhaust heater is removable without removing the flange of the exhaust gateway, thereby facilitating the maintenance of the heater.

DETAILED DESCRIPTION OF THE INVENTION

Next, embodiments of the present invention will be described.

Figure 1:
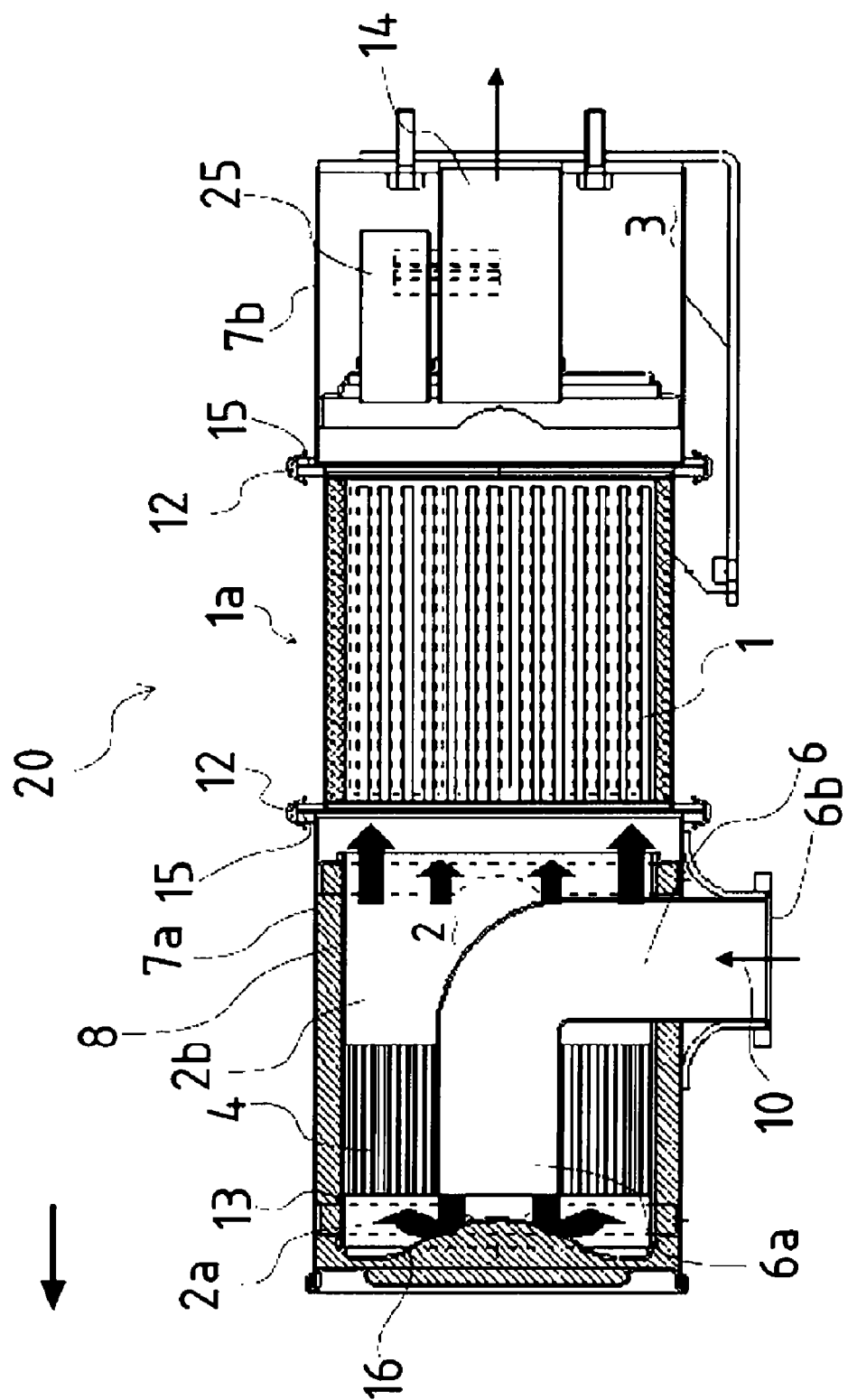
FIG. 1 is a schematic diagram of a black smoke exhaust purification apparatus according to embodiment 1 of the present invention.
Figure 2:
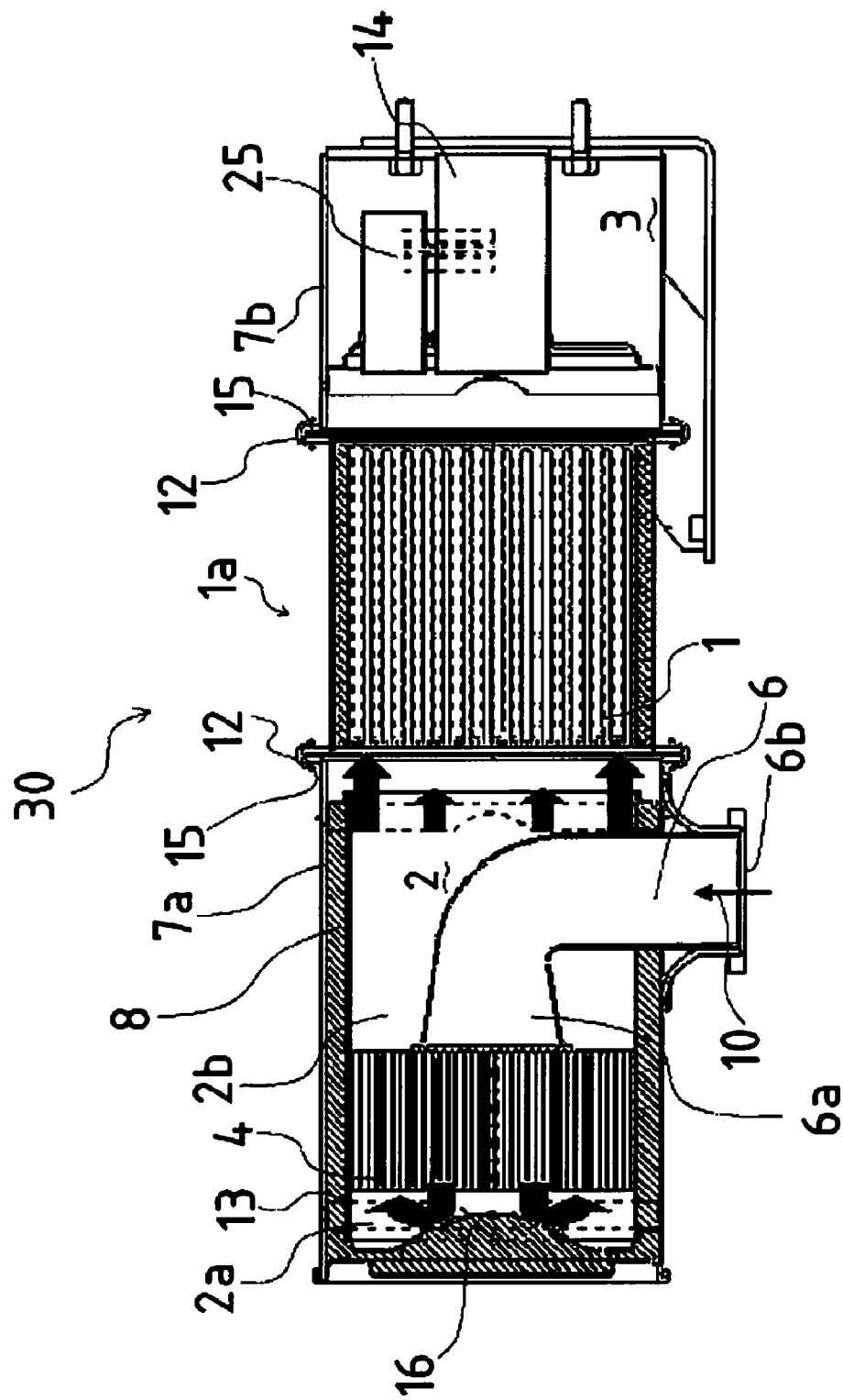
FIG. 2 is a schematic diagram of a black smoke exhaust purification apparatus according to embodiment 2 of the present invention.
Figure 3:
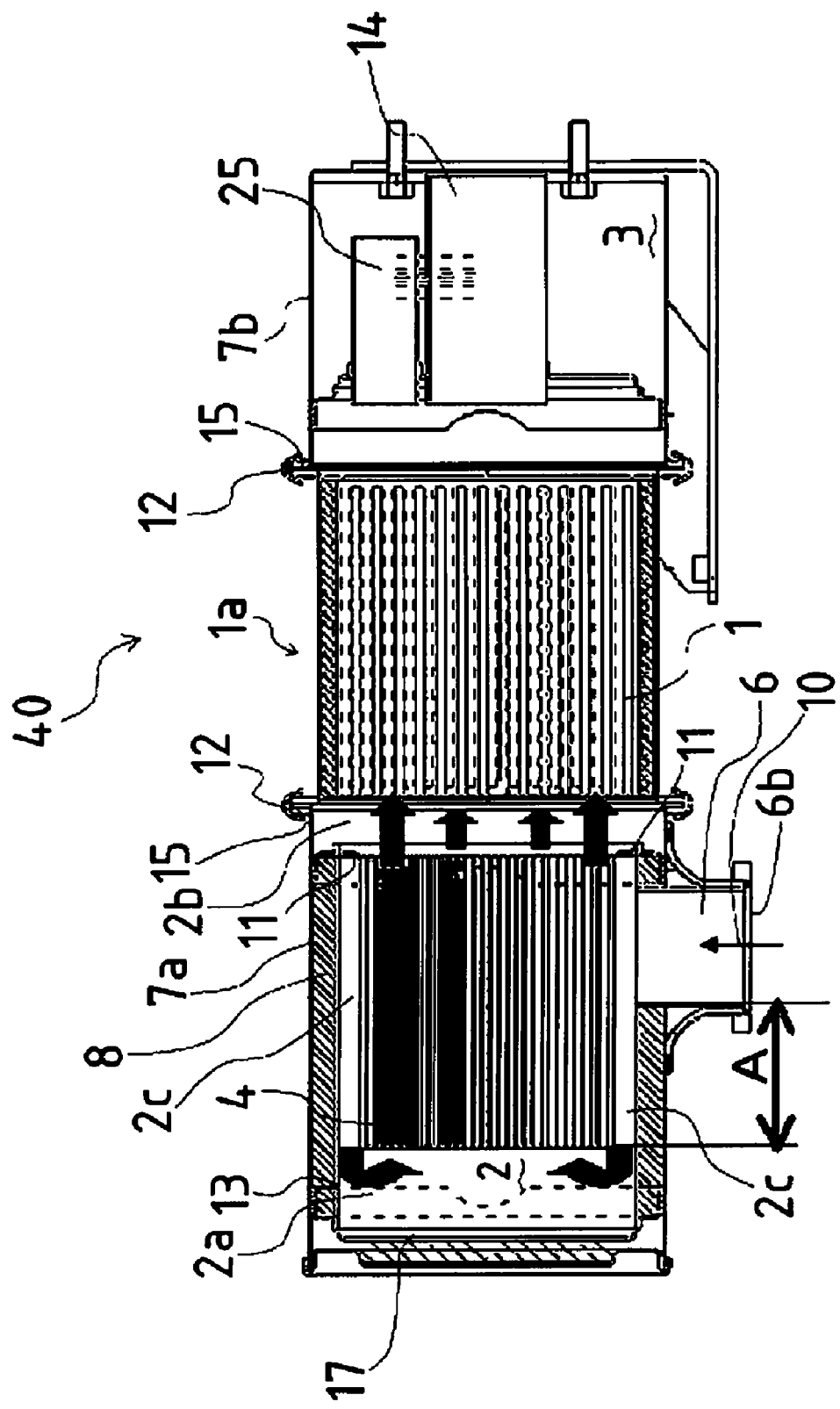
FIG. 3 is a schematic diagram of a black smoke exhaust purification apparatus according to embodiment 3 of the present invention.
Figure 4:
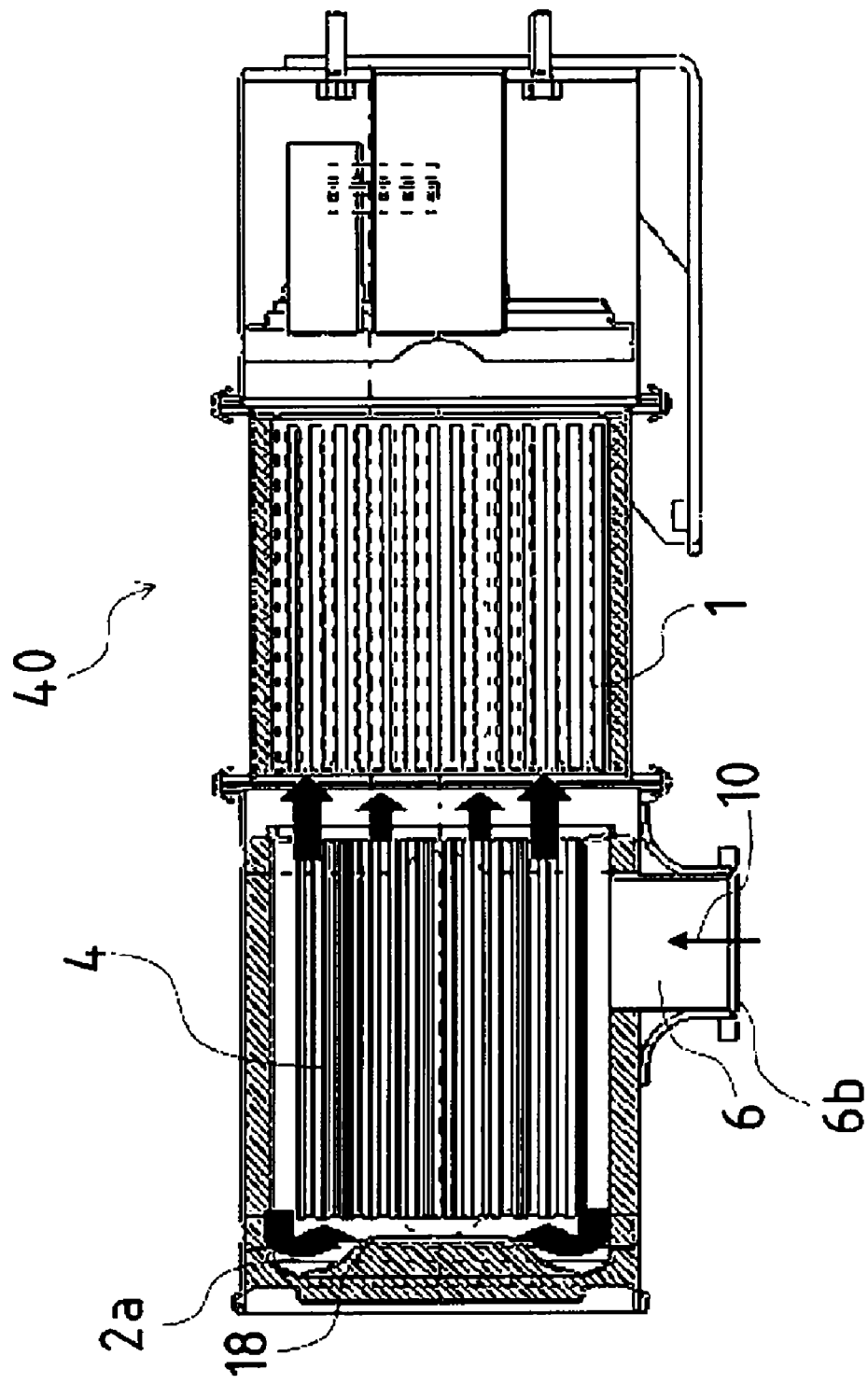
FIG. 4 is a schematic diagram of a black smoke exhaust purification apparatus according to embodiment 4 of the present invention.
Figure 5:
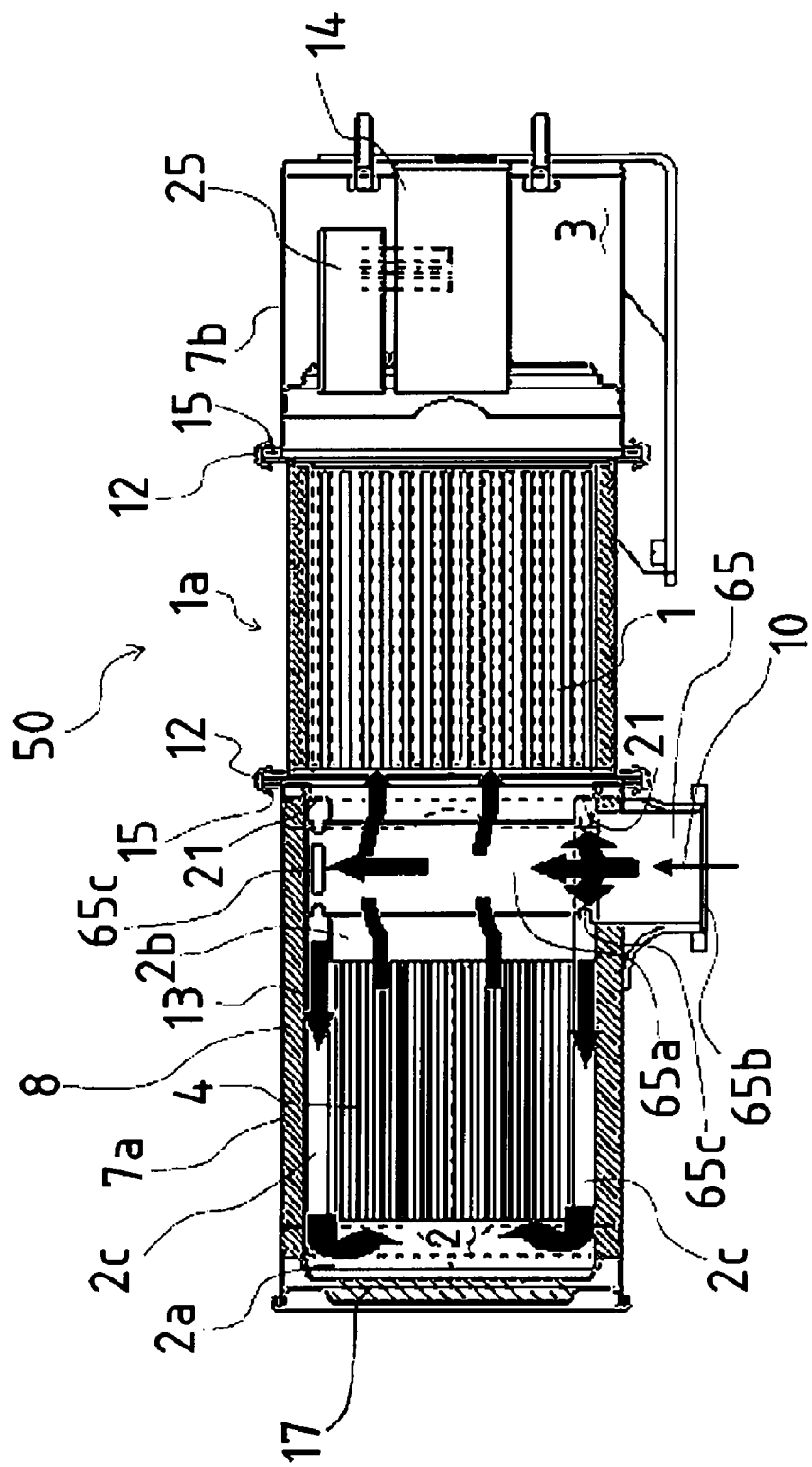
FIG. 5 is a schematic diagram of a black smoke exhaust purification apparatus according to embodiment 5 of the present invention.
Figure 6:
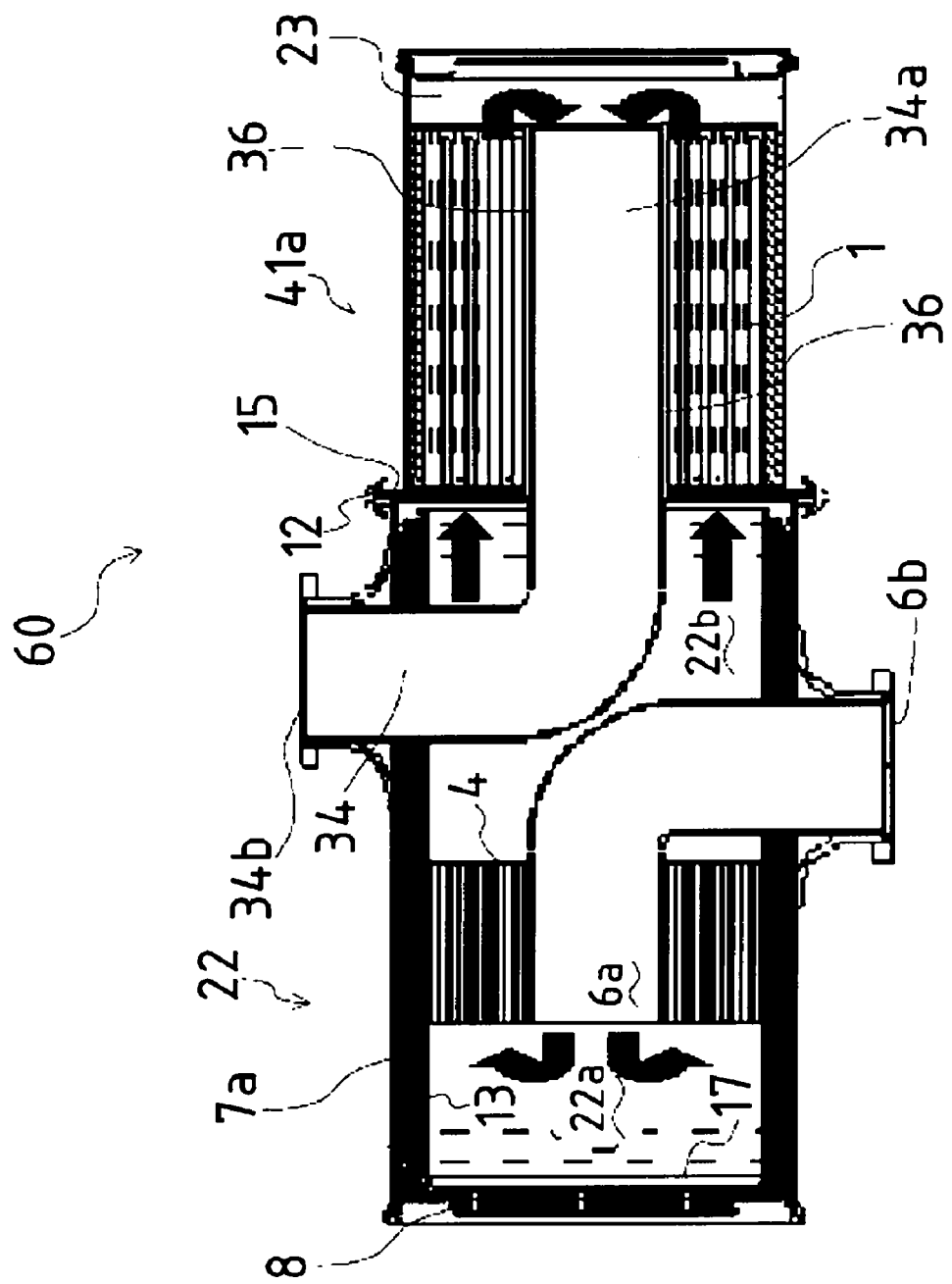
FIG. 6 is a schematic diagram of a black smoke exhaust purification apparatus according to embodiment 6 of the present invention.
Figure 7:
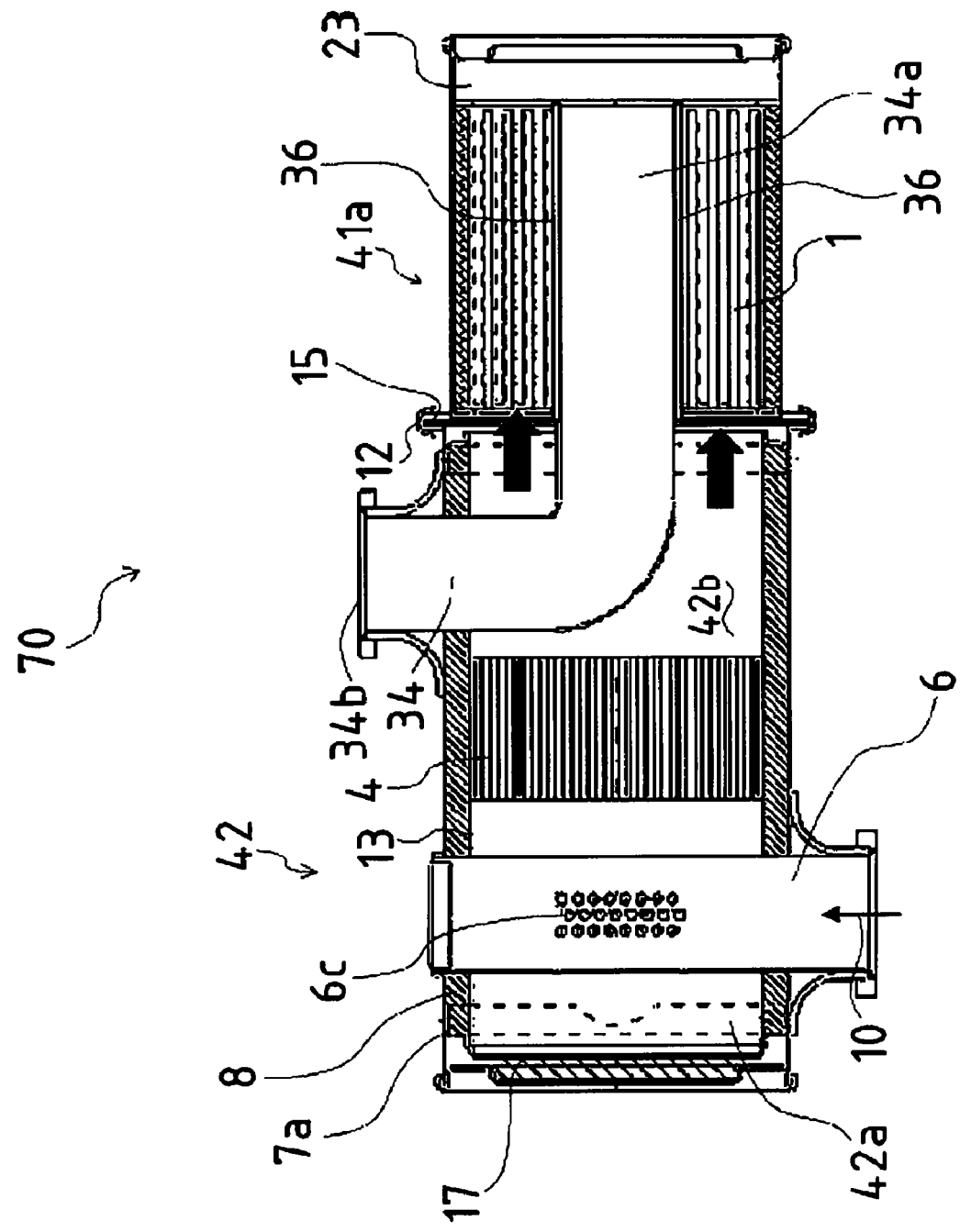
FIG. 7 is a schematic diagram of a black smoke exhaust purification apparatus according to embodiment 7 of the present invention.
Figure 8:
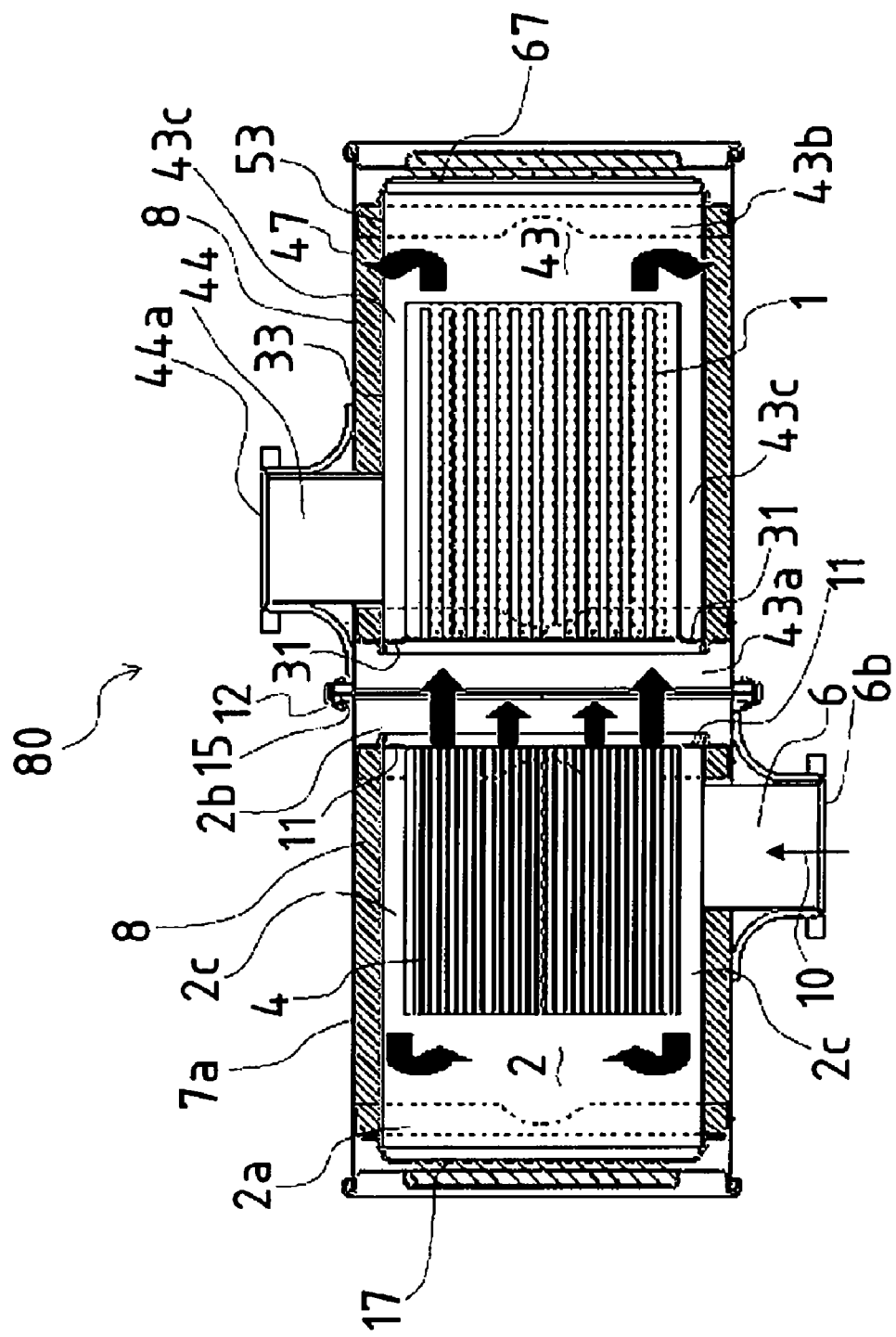
FIG. 8 is a schematic diagram of a black smoke exhaust purification apparatus according to embodiment 8 of the present invention.
Figure 9:
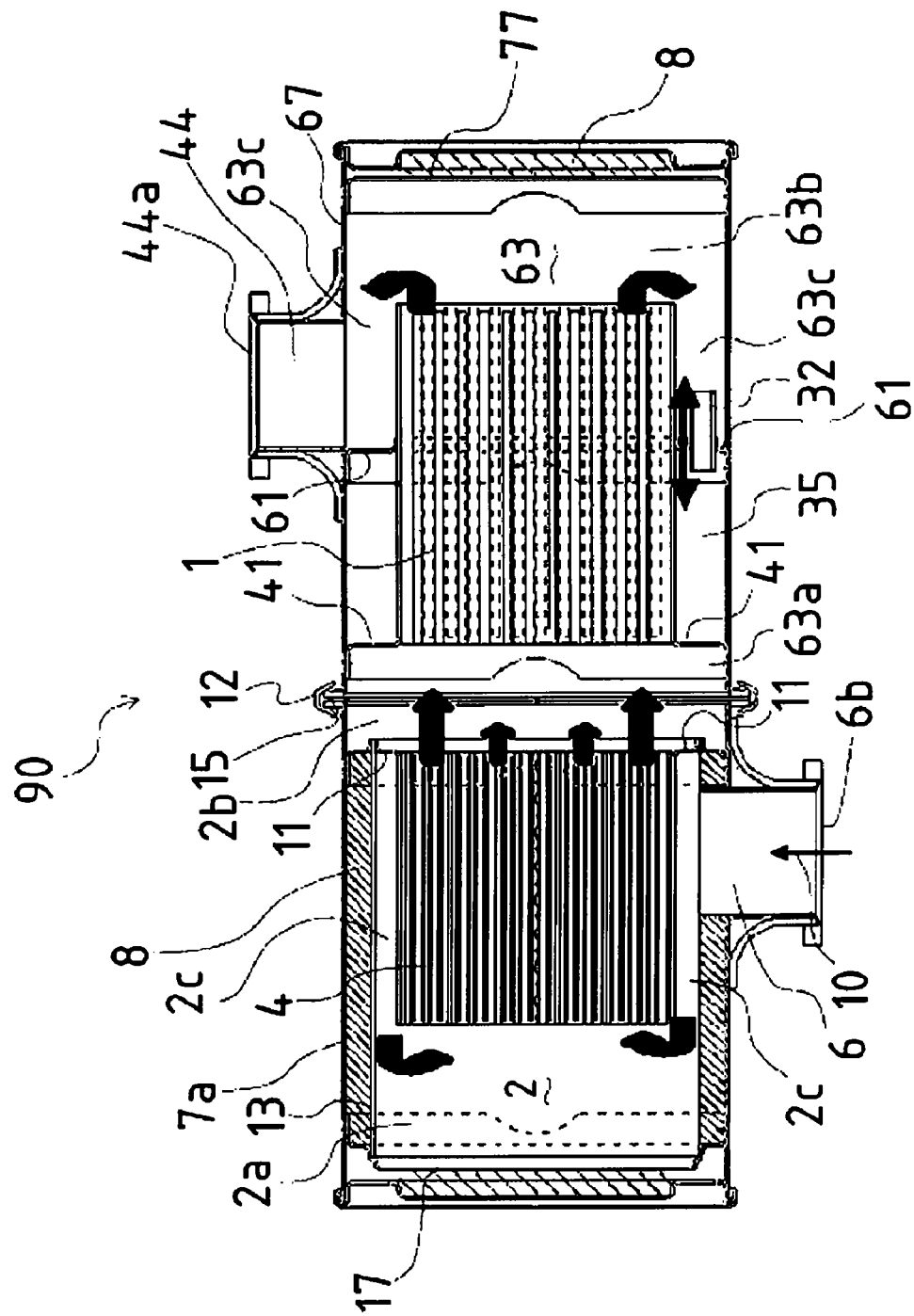
FIG. 9 is a schematic diagram of a black smoke exhaust purification apparatus according to embodiment 9 of the present invention.
Figure 10:
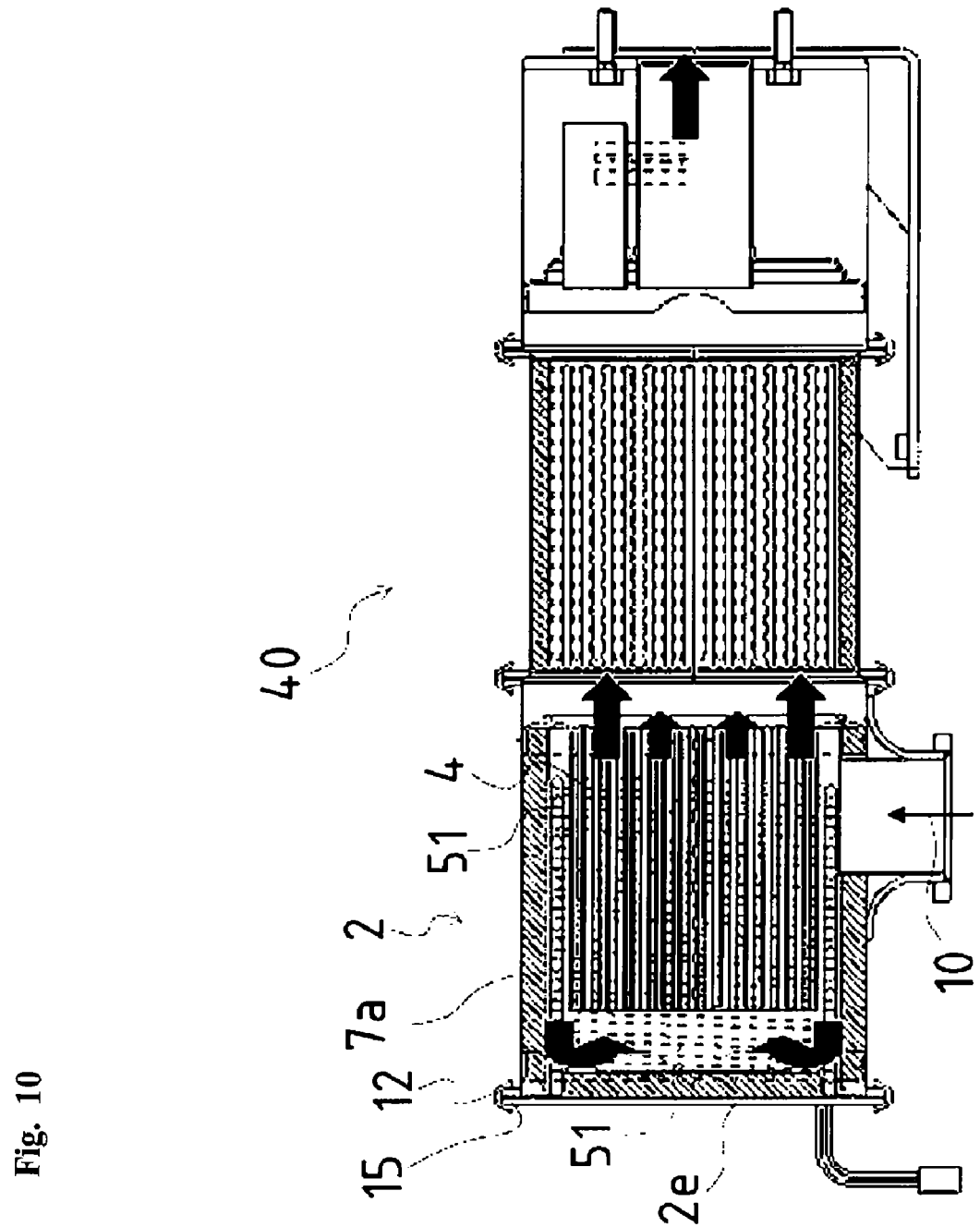
FIG. 10 is a schematic diagram of a black smoke exhaust purification apparatus according to embodiment 10 of the present invention.
Figure 11:
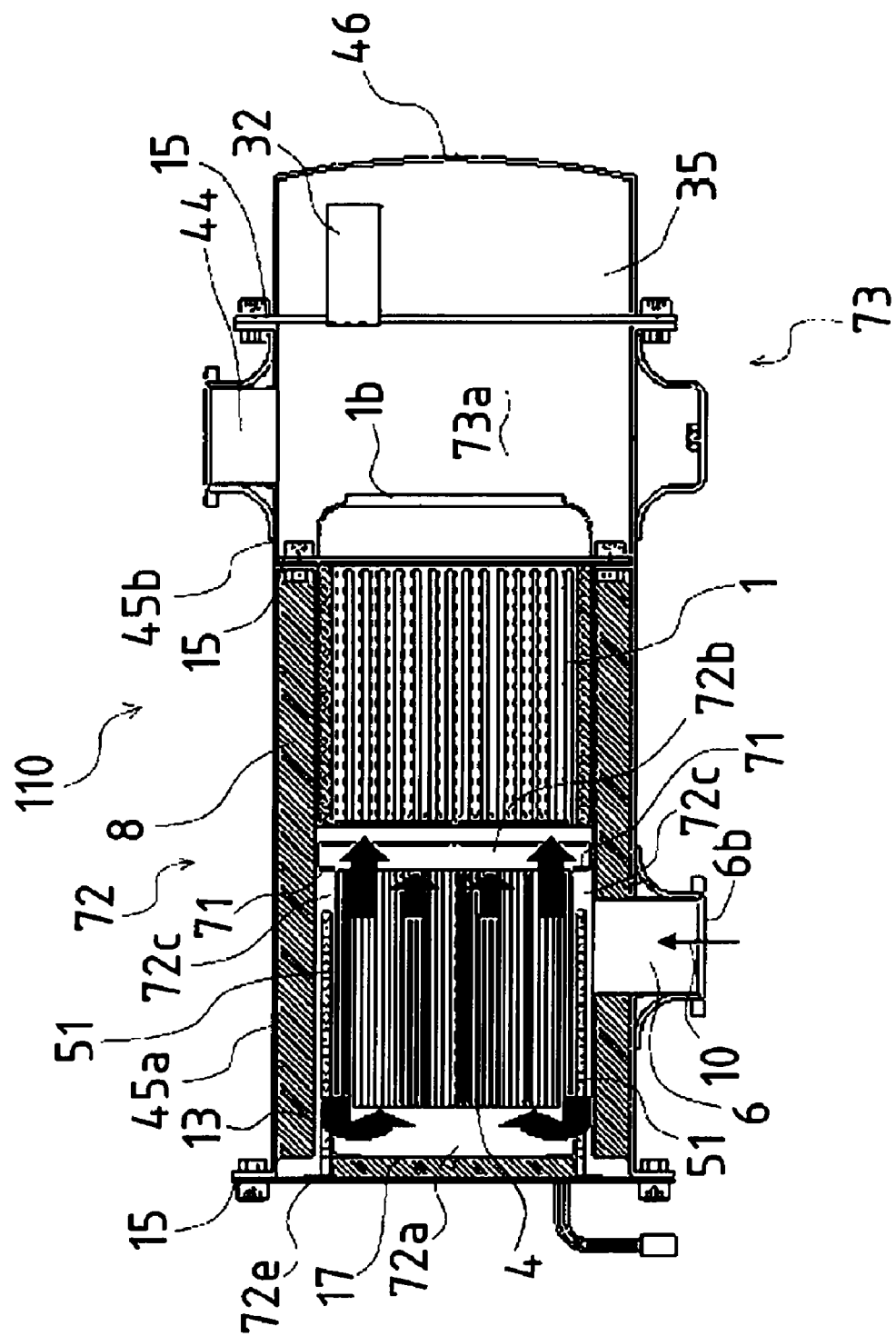
FIG. 11 is a schematic diagram of a black smoke exhaust purification apparatus according to embodiment 11 of the present invention.
Figure 12:
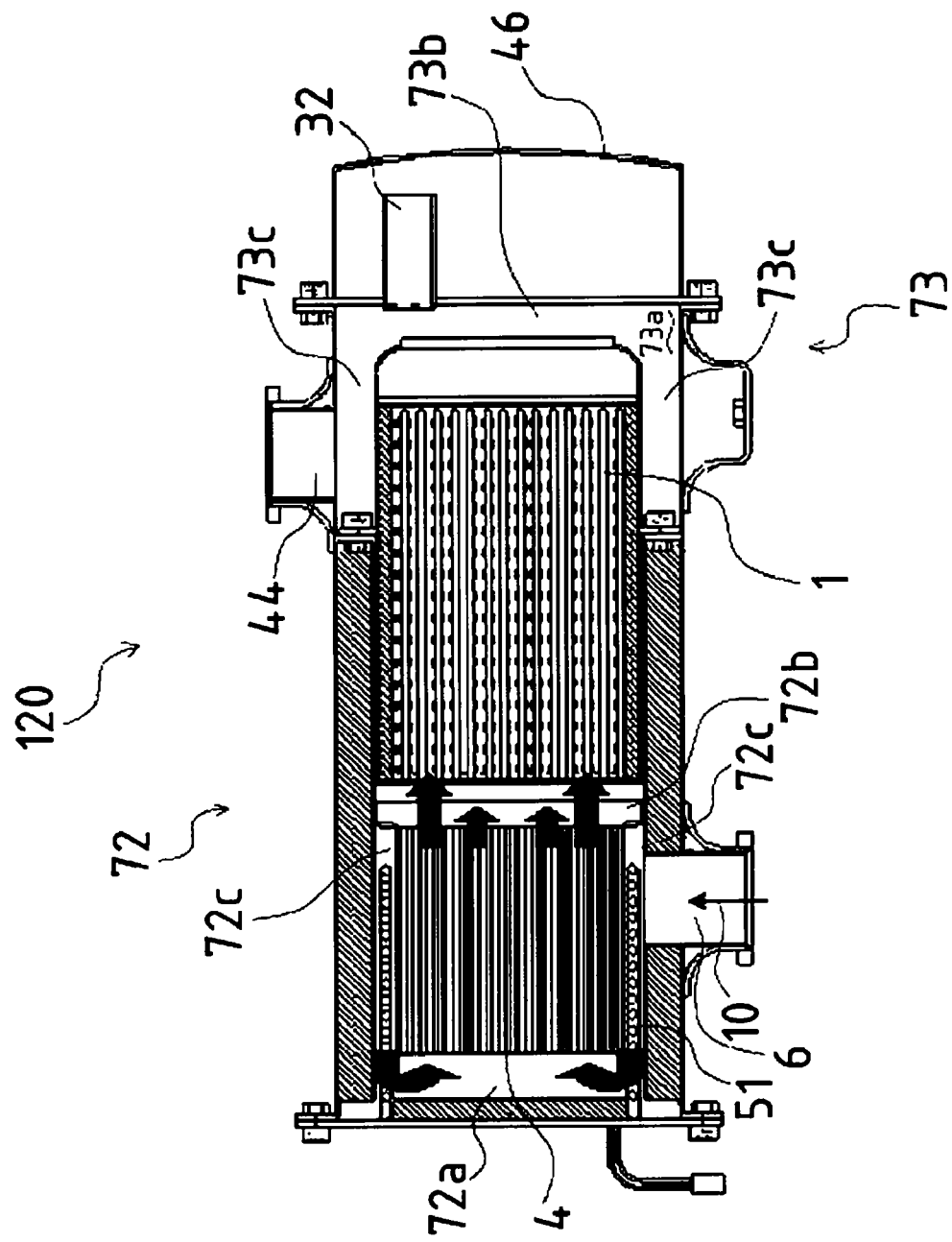
FIG. 12 is a schematic diagram of a black smoke exhaust purification apparatus according to embodiment 12 of the present invention.
Figure 13:
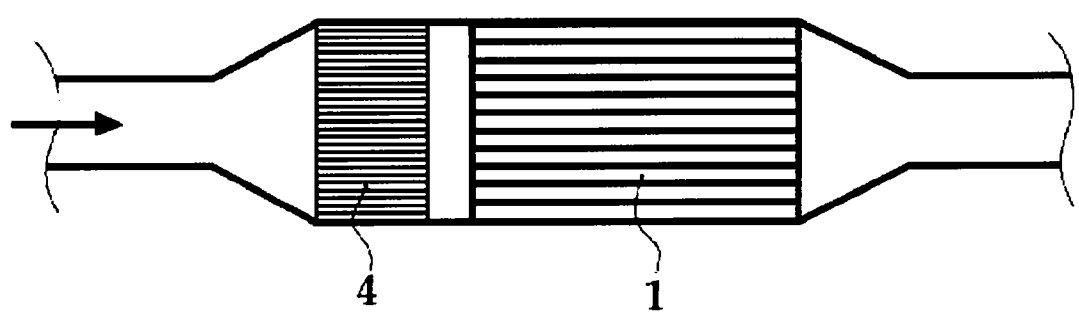
FIG. 13 is a cross-sectional diagram of the existent exhaust after treatment device for automobile use.
Figure 14:
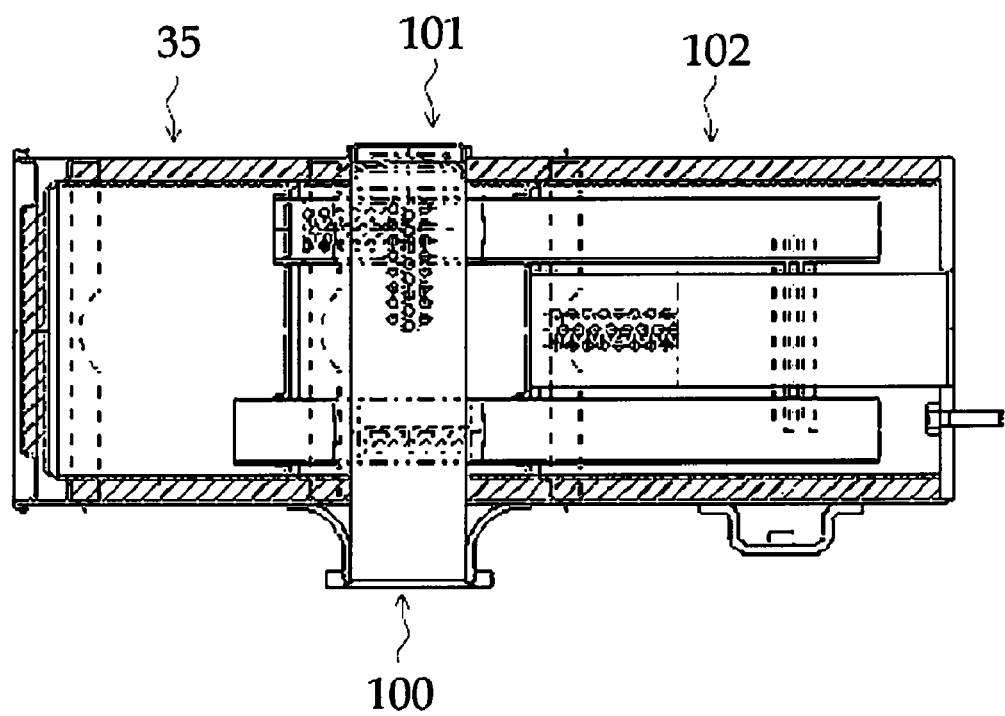
FIG. 14 is a schematic diagram of a conventional industrial muffler.

FIG. 1 is a schematic diagram of a black smoke exhaust purification apparatus according to embodiment 1 of the present invention. FIG. 2 is a schematic diagram of a black smoke exhaust purification apparatus according to embodiment 2 of the present invention. FIG. 3 is schematic diagram of a black smoke exhaust purification apparatus according to embodiment 3 of the present invention. FIG. 4 is a schematic diagram of a black smoke exhaust purification apparatus according to embodiment 4 of the present invention. FIG. 5 is schematic diagram of a black smoke exhaust purification apparatus according to embodiment 5 of the present invention. FIG. 6 is a schematic diagram of a black smoke exhaust purification apparatus according to embodiment 6 of the present invention. FIG. 7 is a schematic diagram of a black smoke exhaust purification apparatus according to embodiment 7 of the present invention. FIG. 8 is a schematic diagram of a black smoke exhaust purification apparatus according to embodiment 8 of the present invention. FIG. 9 is a schematic diagram of a black smoke exhaust purification apparatus according to embodiment 9 of the present invention. FIG. 10 is a schematic diagram of a black smoke exhaust purification apparatus according to embodiment 10 of the present invention. FIG. 11 is a schematic diagram of a black smoke exhaust purification apparatus according to embodiment 11 of the present invention. FIG. 12 is a schematic diagram of a black smoke exhaust purification apparatus according to embodiment 12 of the present invention. FIG. 13 is a cross-sectional diagram of the existent exhaust after treatment device for automobile use. FIG. 14 is a schematic diagram of a conventional industrial muffler.

Embodiment 1

An entire construction of a black smoke exhaust purification apparatus for a diesel engine according to embodiment 1 of the present invention will be described with reference to FIG. 1.

As shown in FIG. 1, the black smoke exhaust purification apparatus for a diesel engine 20 (hereinafter, referred to as a black smoke exhaust purification apparatus) is comprised of an inlet portion 2, a diesel particulate filter 1 (hereinafter, referred to as a particulate filter) and an outlet portion 3. The inlet portion 2 and the outlet portion 3 are formed in housings 7a, 7b, respectively. The particulate filter 1 is disposed at an installation portion 1a between the housings 7a and 7b. The particulate filter 1 keeps airtightness thereof by the housings 7a, 7b and gaskets 15 disposed there between, and all of them are integrally fixed by a V-shaped belt 12. The inlet portion 2 is arranged at the anterior portion thereof with an oxidation catalyst 4 (a direction of arrow is defined as the front. The same holds for the following embodiments). The oxidation catalyst 4 is provided at the upstream (the front side) thereof with an upstream spacial portion 2a while the oxidation catalyst 4 is provided at the downstream thereof with a downstream spacial portion 2b. The inlet portion 2 is provided with an adiabatic acoustic material 8, which is pressed on an inner wall of the inlet portion 2 at an adiabatic acoustic material holding member 13 and an inner wall portion 16.

The particulate filter 1 is removable from the installation portion 1a.

The oxidation catalyst 4 and the particulate filter 1 are arranged in series inside of the black smoke exhaust purification apparatus, and the particulate filter 1 is arranged linearly in the discharging direction of the oxidation catalyst 4. A direction introducing exhaust gas of the particulate filter 1 corresponds to the one discharging exhaust gas of the oxidation catalyst 4.

The inlet portion 2 is provided with an inlet pipe 6 for introducing exhaust gas 10 from an engine (not shown) as an exhaust gas passage. The inlet pipe 6 penetrates the inlet portion 2 from the lower side thereof in the approximately vertical direction, and it is approximately orthogonally inflected in the spacial portion 2a so as to be extended forward. An anterior portion 6a of the inlet pipe 6 extended forward penetrates the central portion of the oxidation catalyst 4, and one end of the inlet pipe 6 is formed so as to be substantially located at the front end of the oxidation catalyst 4. The inlet pipe 6 is provided at the other end thereof with an opening portion 6b so as to connect to the engine via an exhaust pipe (not shown). The opening portion 6b is interposed between the oxidation catalyst 4 and the particulate filter 1 in an anteroposterior direction which forms an exhaust inlet. The exhaust gas 10 enters into the upstream spacial portion 2a of the inlet portion 2 through the inlet pipe 6. The inner wall portion 16 disposed so as to cover the front surface of the housing 7a is constructed so that the central portion thereof is approximately hemispherically extended backward, so as to be convexly formed on cross-sectional view, which forms an exhaust gas introducing portion. The outlet portion 3 is provided with an outlet pipe 14 for discharging exhaust gas 10 and a resonant tube 25, for reducing a noise at the time of discharging exhaust gas, parallel to the outlet pipe 14.

Due to the above construction, exhaust gas 10 is introduced into the upstream spacial portion 2a at the upstream side of the oxidation catalyst 4 through the inlet pipe 6. As shown in FIG. 1, exhaust gas 10 introduced from the anterior portion 6a of the inlet pipe 6 into the upstream spacial portion 2a is introduced so as to flow to the outer peripheral portion of the oxidation catalyst 4 by the inner wall portion 16 as the exhaust gas introducing portion. Then, exhaust gas 10 passes through the oxidation catalyst 4 and enters into the downstream spacial portion 2b so as to go through the middle portion of the inlet pipe 6 in the downstream spacial portion 2b. The exhaust gas 10 passes through (is purified by) the particulate filter 1 via the downstream spacial portion 2 band enters into the outlet pipe 14 so as to be discharged from the outlet pipe 14.

As described above, since the inlet pipe 6 penetrates the central portion of the oxidation catalyst 4, the oxidation catalyst 4 has only an outer peripheral portion. Exhaust gas 10 mainly passes through the outer peripheral portion of the oxidation catalyst 4, and it can relatively largely flow to the outer periphery of the filter 1 located backward. Because the inner wall portion 16 is provided as the exhaust gas introducing portion, relatively more exhaust gas can be introduced and flow to the outer peripheral portion of the filter 1, whereby the temperatures of the filter 1 can be equalized.

Thus, in the black smoke exhaust purification apparatus 20 in which the oxidation catalyst 4 and the particulate filter 1 are arranged in series, the opening portion 6b as the inlet of exhaust gas 10 is interposed between the oxidation catalyst 4 and the particulate filter 1, and the inlet pipe 6 as the exhaust gas passage is extended from the opening portion 6b as the inlet portion and passes through the central portion of the oxidation catalyst 4 so as to be connected to the upstream spacial portion 2a of the oxidation catalyst 4, so that exhaust gas 10 flows from the outer peripheral portion of the oxidation catalyst 4 carrier located forward of the particulate filter 1 and relatively more exhaust gas 10 passes through the outer peripheral portion of the particulate filter 1, thereby equalizing the temperature of the particulate filter 1. The opening portion 6b of the inlet pipe 6 for exhaust gas 10 can be provided at the center of side of the casing (the apparatus body) so that a mounting performance for the black smoke exhaust purification apparatus (the after treatment device) is improved.

Because the inner wall portion 16 as the convex exhaust gas introducing portion is provided at the upstream spacial portion 2a of the oxidation catalyst 4, exhaust gas 10 is certainly introduced to the outside of the oxidation catalyst 4, and it is discharged from the outer peripheral portion of the oxidation catalyst 4 carrier located forward of the filter 1, whereby relatively more exhaust gas 10 passes through the outer peripheral portion of the particulate filter 1, thereby equalizing the temperature of the particulate filter 1.

Embodiment 2

The embodiment 2 of the present invention will be described with reference to FIG. 2.

As shown in FIG. 2, a black smoke exhaust purification apparatus 30 includes the inlet portion 2, the particulate filter 1 and the outlet portion 3. The inlet portion 2 and the outlet portion 3 are formed in housings 7a, 7b, respectively. The particulate filter 1 is disposed at the installation portion 1a between the housings 7a and 7b. The particulate filter 1 keeps airtightness thereof by the housings 7a, 7b and gaskets 15 disposed there between, and all of them are integrally fixed by the V-shaped belt 12. The inlet portion 2 is arranged at the anterior portion thereof with the oxidation catalyst 4. The oxidation catalyst 4 is provided at the upstream side thereof with an upstream spacial portion 2a while the oxidation catalyst 4 is provided at the downstream side thereof with a downstream spacial portion 2b. The inlet portion 2 is provided with the adiabatic acoustic material 8, which is pressed on an inner wall of the inlet portion 2 at the adiabatic acoustic material holding member 13 and the inner wall portion 16.

The particulate filter 1 is removable from the installation portion 1a.

The inlet portion 2 is provided with an inlet pipe 6 for introducing exhaust gas 10 from an engine (not shown) as an exhaust gas passage. The inlet pipe 6 penetrates the inlet portion 2 from the lower side thereof in the approximately vertical direction, and it is approximately orthogonally inflected in the spacial portion 2a so as to be extended forward. An anterior portion 6a of the inlet pipe 6 extended forward is formed as a tapered shape, and the cross-sectional diameter of the inlet pipe 6 is expanded toward the anterior portion thereof. One end of the inlet pipe 6 is approximately air-tightly connected to the central portion of the rear end surface of the oxidation catalyst. The inlet pipe 6 is provided at the other end thereof with the opening portion 6b so as to connect to the engine through the exhaust pipe (not shown). The opening portion 6b is interposed between the oxidation catalyst 4 and the particulate filter 1 in an anteroposterior direction which forms an exhaust inlet. The exhaust gas 10 enters into the upstream spacial portion 2a of the inlet portion 2 through the inlet pipe 6. As is the case with the embodiment 1, the inner wall portion 16 is constructed so that the central portion thereof is approximately hemispherically extended backward, so as to be convexly formed in cross-sectional view, which forms an exhaust gas introducing portion. The outlet portion 3 is provided with the outlet pipe 14 for discharging exhaust gas 10 and a resonant tube 25, for reducing a noise at the time of discharging exhaust gas, parallel to the outlet pipe 14.

Due to the above construction, exhaust gas 10 is introduced into the upstream spacial portion 2a at the upstream side of the oxidation catalyst 4 through the inlet pipe 6. As shown in FIG. 2, exhaust gas 10 introduced from the anterior portion 6a of the inlet pipe 6 into the upstream spacial portion 2a is introduced so as to flow to the outer peripheral portion of the oxidation catalyst 4 by the inner wall portion 16 as the exhaust gas introducing portion. Then, exhaust gas 10 passes through the oxidation catalyst 4 and enters into the downstream spacial portion 2b so as to go through the middle portion of the inlet pipe 6 in the downstream spacial portion 2b. The exhaust gas 10 passes through (is purified by) the particulate filter 1 via the downstream spacial portion 2 band enters into the outlet pipe 14 so as to be discharged from the outlet pipe 14.

More specifically, as a function of the oxidation catalyst 4 the CO or the HC is oxidized due to the catalyst supported on the oxidation catalyst 4, while exhaust gas 10 passes through a cellular gas passage (not shown). By blowing exhaust gas 10 from the tapered anterior portion 6a of the inlet pipe 6, exhaust gas 10 passes through the cellular gas passage so as to expand toward the outer periphery thereof and reaches the upstream spacial portion 2a. The gas expanded toward the outer periphery of the passage at the upstream spacial portion 2a flows to the outer peripheral portions of the oxidation catalyst 4 and the downstream spacial portion 2b, so as to go thorough the particulate filter 1 located backward. Thus, more exhaust gas 10 can flow to the relatively outer peripheral portion of the particulate filter 1. Total amount of exhaust gas 10 does not necessarily flow to the oxidation catalyst 4, unlike the case of the particulate filter 1. For this reason, complete air-tight condition need not be kept in the connecting portion of the tapered anterior portion 6a of the inlet pipe 6 and the end surface of the oxidation catalyst 4. As is the case with the embodiment 1, in the present embodiment, as the inner wall portion 16 is provided as the exhaust gas introducing portion, exhaust gas 10 is further introduced to the outer peripheral portion of the oxidation catalyst 4, and relatively more exhaust gas 10 can flow to the outer peripheral portion of the particulate filter 1 located backward, whereby the temperatures of the filter 1 can be equalized.

As seen from the above, in the black smoke exhaust purification apparatus 30 in which the oxidation catalyst 4 and the particulate filter 1 are arranged in series, the opening portion 6b as the inlet of exhaust gas 10 is interposed between the oxidation catalyst 4 and the particulate filter 1, and the inlet pipe 6 as the exhaust gas passage is extended from the opening portion 6b as the inlet portion so as to approximately air-tightly connect it to the end surface central portion at the downstream side of the oxidation catalyst 4 so that exhaust gas 10 is discharged from the outer peripheral portion of the oxidation catalyst 4 carrier located forward of the filter, and relatively more exhaust gas 10 is flown to the outer peripheral portion of the particulate filter 1, thereby equalizing the temperature of the particulate filter 1. The opening portion 6b of the inlet pipe 6 for exhaust gas 10 can be provided at the center of side of the casing (the apparatus body), so that a mounting performance for the black smoke exhaust purification apparatus (the after treatment device) is improved. The time when exhaust gas 10 passes through the oxidation catalyst 4 carrier becomes longer by using the tapered inlet pipe 6, whereby the CO or the HC can be assuredly oxidized.

As is the case with the embodiment 1, the inner wall portion 16 as the convex exhaust gas introducing portion is provided with the upstream spacial portion 2a of the oxidation catalyst 4 so that exhaust gas 10 is certainly introduced to the outside of the oxidation catalyst 4 and exhaust gas 10 is discharged from the outer peripheral portion of the oxidation catalyst 4 carrier located forward of the filter 1, whereby relatively more exhaust gas 10 flows to the outer peripheral portion of the particulate filter 1, thereby equalizing the temperature of the particulate filter 1.

Embodiment 3

The embodiment 3 of the present invention will be described with reference to FIG. 3.

As shown in FIG. 3, a black smoke exhaust purification apparatus 40 includes the inlet portion 2, the particulate filter 1 and the outlet portion 3. The inlet portion 2 and the outlet portion 3 are formed in housings 7a, 7b, respectively. The particulate filter 1 is disposed at the installation portion 1a between the housings 7a and 7b. The particulate filter 1 keeps airtightness thereof by the housings 7a, 7b and gaskets 15 disposed there between, and all of them are integrally fixed by the V-shaped belt 12. The inlet portion 2 is arranged therein with the oxidation catalyst 4. The oxidation catalyst 4 is provided at the upstream side thereof with an upstream spacial portion 2a while the oxidation catalyst 4 is provided at the downstream side thereof with a downstream spacial portion 2b. A space 2c having a given interval is provided between the outer peripheral portion of the oxidation catalyst 4 and the inside of the housing 7a, and the rear end of the space 2c is sealed with a partition wall 11. Thus, the space 2c forms an exhaust gas passage for introducing exhaust gas 10 into the upstream spacial portion 2a. The inlet portion 2 is provided with the adiabatic acoustic material 8, which is pressed on an inner wall of the inlet portion 2 at the adiabatic acoustic material holding member 13 and the inner wall portion 16.

The particulate filter 1 is removable from the installation portion 1a.

The inlet portion 2 is provided with an inlet pipe 6 for introducing exhaust gas 10 from an engine (not shown) as an exhaust gas passage. The inlet pipe 6 is continuously connected to the space 2c in the inlet portion 2 from the lower side thereof. The inlet pipe 6 is provided at one end thereof with the opening portion 6b so as to connect to the engine via the exhaust pipe (not shown), and the opening portion 6b becomes an exhaust inlet. As shown in FIG. 3, the opening portion 6b is arranged so that a distance A between the inner peripheral end of the opening portion 6b and the front end of the oxidation catalyst 4 is zero or more. In other words, the opening portion 6b as the exhaust inlet is provided so as not to approach the upstream spacial portion 2a of the oxidation catalyst 4. The exhaust gas 10 enters into the upstream spacial portion 2a of the inlet portion 2 via the inlet pipe 6 and the outer peripheral space 2c of the oxidation catalyst 4. The outlet portion 3 is provided with the outlet pipe 14 for discharging exhaust gas 10 and a resonant tube 25, for reducing a noise at the time of discharging exhaust gas, parallel to the outlet pipe 14.

Due to the above construction, exhaust gas 10 enters into the outer peripheral space 2c of the oxidation catalyst 4 via the inlet pipe 6, and it is introduced from the outer peripheral space 2c into the upstream spacial portion 2a disposed upstream of the oxidation catalyst 4. As shown in FIG. 3, exhaust gas 10 introduced into the upstream spacial portion 2a flows to the outer peripheral side of the oxidation catalyst 4. More exhaust gas 10 passes through (is purified by) the relatively outer peripheral side of the particulate filter 1 and enters into the outlet pipe 14 so as to be discharged from the outlet pipe 14.

As a result of the keen examinations by the inventors or the like, by flowing exhaust gas 10 to the upstream spacial portion 2a through the outer peripheral space 2c of the oxidation catalyst 4 and making the value of A zero or more, exhaust gas 10 can be introduced to the oxidation catalyst 4 by slightly increasing the gas flow rate toward the outer peripheral portion.

Thus, in the black smoke exhaust purification apparatus 40 in which the oxidation catalyst 4 and the filter 1 are arranged in series, the oxidation catalyst 4 is provided on the outer peripheral portion and at the upstream side thereof with the spaces and the inlet pipe 6 for exhaust gas 10 is continuously connected to the outer peripheral portion space 2c. Further, in the black smoke exhaust purification apparatus 40, the opening portion 6b as the inlet portion of the inlet pipe 6 is provided so as not to approach the upstream spacial portion 2a of the oxidation catalyst 4, and exhaust gas 10 is introduced into the upstream spacial portion 2a of the oxidation catalyst 4 through the outer peripheral portion space 2c. Accordingly, exhaust gas 10 can be approximately equally introduced to the oxidation catalyst 4. As a result, exhaust gas 10 is discharged from the outer peripheral portion of the oxidation catalyst 4 carrier located forward of the particulate filter 1, and relatively more exhaust gas 10 flows to the outer peripheral portion of the particulate filter 1 so that the temperatures of the particulate filter 1 are equalized. The opening portion 6b of the inlet pipe 6 as the inlet for exhaust gas 10 can be provided at the center of side of the casing (the apparatus body) so that the mounting performance for the black smoke exhaust purification apparatus (the after treatment device) is improved.

Embodiment 4

The embodiment 4 of the present invention will be described with reference to FIG. 4.

As shown in FIG. 4, in the black smoke exhaust purification apparatus 40 as described in the embodiment 3, the oxidation catalyst 4 is provided at the front side thereof with a guide 18, the central portion of which is extended backward and is formed as a trapezoidal shape so as to introduce exhaust gas 10.

Thus, by arranging the guide 18 at the black smoke exhaust purification apparatus 40, as shown in FIG. 4, the flow direction of exhaust gas 10 inflowing from the outer peripheral portion space 2c is reversed at the outer peripheral portion of the guide 18, and exhaust gas 10 flows into the outer peripheral side of the inlet of the oxidation catalyst 4. In other words, exhaust gas 10 does not unevenly flow into the central portion of the oxidation catalyst 4, thereby a larger amount of exhaust gas 10 can flow to the outer peripheral side of the oxidation catalyst 4 more assuredly.

As seen from the above, since the guide 18 is provided so that exhaust gas 10 introduced into the upstream spacial portion 2a of the oxidation catalyst 4 does not unevenly flow to the central side of the oxidation catalyst 4, exhaust gas 10 can be further assuredly introduced to the outer peripheral portion of the oxidation catalyst 4, in comparison to the black smoke exhaust purification apparatus 40 as described in the embodiment 3, and relatively more exhaust gas 10 flows to the outer peripheral portion of the particulate filter 1 located backward of the oxidation catalyst 4, so as to equalize the temperatures of the particulate filter 1. In the black smoke exhaust purification apparatus 40 of the present embodiment, the opening portion 6b of the inlet pipe 6 for exhaust gas 10 can be provided at the center of side of the casing so that the mounting performance for the black smoke exhaust purification apparatus (the after treatment device) is improved.

Embodiment 5

The embodiment 5 of the present invention will be described with reference to FIG. 5.

As shown in FIG. 5, the black smoke exhaust purification apparatus 50 is comprised of the inlet portion 2, the particulate filter 1 and the outlet portion 3. The inlet portion 2 and the outlet portion 3 are formed in housings 7a, 7b, respectively. The particulate filter 1 is disposed at the installation portion 1a between the housings 7a and 7b. The particulate filter 1 keeps airtightness thereof by the housings 7a, 7b and gaskets 15 disposed there between, and all of them are integrally fixed by the V-shaped belt 12. The inlet portion 2 is arranged at the anterior portion thereof with the oxidation catalyst 4. The oxidation catalyst 4 is provided at the upstream side thereof with an upstream spacial portion 2a while the oxidation catalyst 4 is provided at the downstream side thereof with a downstream spacial portion 2b. The outer peripheral portion of the oxidation catalyst 4 and the inner side of the housing 7a are formed there between with the space 2c having the given interval. The rear ends of the spaces 2c are extended to the vicinity of the rear end of the inlet portion 2 and are sealed by a partition wall 21. The inlet portion 2 is provided on the outer periphery thereof with the adiabatic acoustic material 8, which is pressed on an inner wall of the inlet portion 2 at the adiabatic acoustic material holding member 13 and an inner wall portion 17.

The particulate filter 1 is removable from the installation portion 1a.

The inlet portion 2 is provided with an inlet pipe 65 for introducing exhaust gas 10 from an engine (not shown) as an exhaust gas passage. The inlet pipe 65 penetrates the inlet portion 2 from the lower side thereof in the approximately vertical direction, and it is projected upward in the spacial portion 2c so as to form a projecting portion 65a, an upper end of which is engaged to the adiabatic acoustic material holding member 13. The projecting portion 65a is provided at the upper end portion and the lower portion thereof with plurality of opening portions 65c so as to be continuously connected to the inside of the space 2c, thereby being able to flow exhaust gas 10 from the inlet pipe 65 into the inside of the space 2c. The inlet pipe 65 is provided at one end thereof with an opening portion 65b so as to be connected to the engine via the exhaust pipe (not shown), and the opening portion 65b is interposed between the oxidation catalyst 4 and the particulate filter 1 in the anteroposterior direction, which forms the exhaust inlet. The exhaust gas 10 enters into the inside of the upstream spacial portion 2a of the inlet portion 2 via the inlet pipe 65, the projecting portion 65a and the space 2c. The outlet portion 3 is provided with an outlet pipe 14 for discharging exhaust gas 10 as the exhaust outlet and a resonant tube 25, for reducing a noise at the time of discharging exhaust gas, parallel to the outlet pipe 14.

Due to the above construction, exhaust gas 10 is introduced from the inlet pipe 65 through the opening portion 65*c* on the projecting portion 65*a* of the inlet pipe 65 into the space 2*c* at the outer peripheral side of the oxidation catalyst 4 and is introduced via the space 2*c* into the upstream spacial portion 2*a* provided at the upstream side of the oxidation catalyst 4. As shown in FIG. 5, exhaust gas 10 introduced into the upstream spacial portion 2*a* mainly flows to the outer peripheral side of the inside of the oxidation catalyst 4. The exhaust gas 10 passes through the oxidation catalyst 4 so as to enter into the downstream spacial portion 2 band escapes from the projecting portion 65*a* of the downstream spacial portion 2*b* so as to go through (so as to be purified through) the particulate filter 1. The exhaust gas 10 through the particulate filter 1 enters into the outlet pipe 14 so as to be discharged from the outlet pipe 14.

As seen from the above, in the black smoke exhaust purification apparatus 50 for the diesel engine in which the oxidation catalyst 4 and the filter 1 are arranged in series, the opening portion 65*b* as the inlet for exhaust gas 10 is interposed between the oxidation catalyst 4 and the particulate filter 1 and the oxidation catalyst 4 is provided on the outer peripheral portion, upstream and downstream portions thereof with spaces. In the black smoke exhaust purification apparatus 50, the inlet pipe 65 extended from the opening portion 65*b* as the inlet portion is projected into the downstream spacial portion 2*b* of the oxidation catalyst 4, and the midstream and the end portions of the inlet pipe 65 are continuously connected to the space 2*c* on the outer periphery of the oxidation catalyst 4 so as to introduce exhaust gas 10 to the upstream spacial portion 2*a* through the space 2*c* on the outer periphery of the oxidation catalyst 4 so that exhaust gas 10 flowing from the space 2*c* on the outer periphery of the oxidation catalyst 4 which is outside of a double pipe can be prevented from gathering at the central portion of the inlet of the oxidation catalyst 4 and exhaust gas distribution at the inlet of the oxidation catalyst 4 can be further equalized. The inlet pipe 65 penetrates and supports the apparatus body, thereby improving the intensity of the apparatus body.

Incidentally, when the guide 18 introducing exhaust gas 10 as described in the embodiment 4 is attached to the black smoke exhaust purification apparatus 50 of the present embodiment, exhaust gas 10 does not unevenly inflow to the central portion of the oxidation catalyst 4, so that more exhaust gas 10 can further certainly flow to the outer peripheral side of the oxidation catalyst 4.

Embodiment 6

The embodiment 6 of the present invention will be described with reference to FIG. 6.

As shown in FIG. 6, the black smoke exhaust purification apparatus 60 is comprised of a former portion 22 and an installation portion 41*a* for the particulate filter 1. The particulate filter 1 is disposed at the installation portion 41*a* and keeps the air-tightness thereof by the housing 7*a* and the gasket 15, and all of them are integrally fixed by the V-shaped belt 12. The former portion 22 is arranged at the anterior portion thereof with the oxidation catalyst 4. The oxidation catalyst 4 is provided at the upstream side thereof with an upstream spacial portion 22*a* while the oxidation catalyst 4 is provided at the downstream side thereof with a downstream spacial portion 22*b*. The former portion 22 is provided on the outer periphery thereof with the adiabatic acoustic material 8, which is pressed on an inner wall of the former portion 22 at the adiabatic acoustic material holding member 13 and the inner wall portion 17.

The particulate filter 1 is removable from the installation portion 41*a*.

The former portion 22 is provided with an inlet pipe 6 for introducing exhaust gas 10 from an engine (not shown) as an exhaust gas passage. The inlet pipe 6 penetrates the former portion 22 from the lower side thereof in the approximately vertical direction, and it is approximately orthogonally inflected in the spacial portion 22*b* so as to be extended forward. An anterior portion 6*a* of the inlet pipe 6 extended forward penetrates the central portion of the oxidation catalyst 4, and one end of the inlet pipe 6 is formed so as to be substantially located at the front end of the oxidation catalyst 4. The inlet pipe 6 is provided at the other end thereof with an opening portion 6*b* so as to connect to the engine via an exhaust pipe (not shown). The opening portion 6*b* is interposed between the oxidation catalyst 4 and the particulate filter 1 in an anteroposterior direction, which forms an exhaust inlet. The exhaust gas 10 enters into the upstream spacial portion 22*a* of the former portion 22 via the inlet pipe 6.

An outlet pipe 34 for discharge exhaust gas 10 as the exhaust gas passage is arranged from the rear portion of the former portion 22 to the installation portion 41*a*. The outlet pipe 34 penetrates the former portion 22 from the upper side thereof in the approximately vertical direction, and it is approximately orthogonally inflected in the spacial portion 22*b* interposed between the oxidation catalyst 4 and the particulate filter 1 so as to be extended backward. The outlet pipe 34 is provided at one end thereof with an opening portion 34*b*, and the opening portion 34*b* is interposed between the oxidation catalyst 4 and the particulate filter 1 in an anteroposterior direction, which forms an exhaust outlet. A posterior portion 34*a* of the outlet pipe 34 extended backward penetrates the central portion of the particulate filter 1 in the installation portion 41*a*, and the other end of the outlet pipe 34 is formed so as to be substantially located at the rear end of the particulate filter 1. A seal 36 is provided between a surface portion of the posterior portion 34*a* of the outlet pipe 34 penetrated into the particulate filter 1 and the particulate filter 1 facing with the surface portion, thereby preventing exhaust gas 10 from being discharged through a space between the posterior portion 34*a* of the outlet pipe 34 and the particulate filter 1.

Due to the above construction, exhaust gas 10 is introduced into the upstream spacial portion 22*a* at the upstream side of the oxidation catalyst 4 through the inlet pipe 6. As shown in FIG. 6, exhaust gas 10 introduced from the anterior portion 6*a* of the inlet pipe 6 into the upstream spacial portion 22*a* flows to the outer peripheral portion of the oxidation catalyst 4. Then, exhaust gas 10 passes through the oxidation catalyst 4 and enters into the downstream spacial portion 22*b*. The exhaust gas 10 escapes from the midstream of the inlet pipe 6 and the outlet pipe 34 in the downstream spacial portion 22 band passes through the outer peripheral side of the particulate filter 1 (is purified by the particulate filter 1) so as to reach a spacial portion 23. The exhaust gas 10 enters from the spacial portion 23 into the outlet pipe 34 so that exhaust gas is discharged from the outlet pipe 34.

As described above, since the inlet pipe 6 penetrates the central portion of the oxidation catalyst 4, the oxidation catalyst 4 has only an outer peripheral portion, exhaust gas 10 mainly passes through the outer peripheral portion of the oxidation catalyst 4, and exhaust gas can relatively largely flow to the outer periphery of the filter 1 located backward. As the outlet pipe 34 penetrates the central portion of the particulate filter 1, the central portion of the particulate filter 1, which relatively e easily accumulates the heat, can be omitted so that the temperatures of the particulate filter 1 can be equalized.

In the present embodiment, the particulate filter 1 can be removed from the installation portion 41a only by removing one belt 12 and without removing the flange of the exhaust gateway or the like, i.e., without removing the black smoke exhaust purification apparatus 60 from the supporting portion. The particulate filter 1 can be cleaned up at the central portion of the particulate filter 1 as the portion at which the posterior portion 34a of the outlet pipe 34 is removed.

Incidentally, each of the black smoke exhaust purification apparatuses as described in the embodiments 1 to 5 is comprised of the inlet portion 2, the particulate filter 1 and the outlet portion 3, and the particulate filter 1 and the outlet portion 3 located backward have the same configuration in the embodiments 1 to 5. Instead of the particulate filter 1, the outlet portion 3 and the outlet pipe as described in the embodiments 1 to 5, the installation portion 41a of the particulate filter 1 and the outlet pipe 34 as shown in the present embodiment may be attached to the black smoke exhaust purification apparatuses as described above.

Thus, the opening portion 34b as the outlet for exhaust gas 10 is interposed between the oxidation catalyst 4 and the particulate filter 1, and the outlet pipe 34 as the exhaust gas passage is extended from the opening portion 34b as the outlet portion for exhaust gas. The outlet pipe 34 passes through the particulate filter 1 and is connected to the downstream spacial portion 23 of the particulate filter 1. Accordingly, since the particulate filter 1 is formed as the torus-shape, and the central portion thereof that easily collects the heat is omitted, the temperatures of the particulate filter 1 are equalized. The opening portion 34b as the outlet for exhaust gas 10 can be provided at the center of side of the casing (the apparatus body), thereby improving the mounting performance for the black smoke exhaust purification apparatus (the after treatment device).

Embodiment 7

The embodiment 7 of the present invention will be described with reference to FIG. 7.

As shown in FIG. 7, the black smoke exhaust purification apparatus 70 is comprised of a former portion 42 of the black smoke exhaust purification apparatus 70 and the installation portion 41a. The particulate filter 1 is arranged in the installation portion 41a. The particulate filter 1 keeps the air-tightness thereof by the housing 7a and the gasket 15, and all of them are integrally fixed by the V-shaped belt 12. The former portion 42 is provided at approximately middle portion in the anteroposterior direction therein with the oxidation catalyst 4. The oxidation catalyst 4 is provided at the upstream side thereof with the upstream spacial portion 42a while the oxidation catalyst 4 is provided at the downstream side thereof with the downstream spacial portion 42b. The particulate filter 1 is provided at the downstream side thereof with the spacial portion 23. The former portion 42 is provided with the adiabatic acoustic material 8, which is pressed on an inner wall of the former portion 42 at the adiabatic acoustic material holding members 13 and 17.

The particulate filter 1 is removable from the installation portion 41a.

The former portion 42 is provided with an inlet pipe 6 for introducing exhaust gas 10 from an engine (not shown) as an exhaust gas passage. The inlet pipe 6 penetrates the inlet portion 2 in the approximately vertical direction. The inlet pipe 6 is provided at one end thereof with the opening portion as the exhaust inlet so as to connect to the engine through the exhaust pipe (not shown), and the other end thereof is sealed. Multiple pores 6c are provided with a cylindrical side wall in the upstream spacial portion 42a of the inlet pipe 6. The exhaust gas 10 enters from the inlet pipe 6 through the pores 6c into the upstream spacial portion 42a.

The outlet pipe 34 for discharging exhaust gas 10 as the exhaust gas passage is arranged from the former portion 42 to the installation portion 41a. The outlet pipe 34 penetrates the former portion 42 from the upper side thereof in the approximately vertical direction, and it is approximately orthogonally inflected in the spacial portion 42b provided between the oxidation catalyst 4 and the particulate filter 1 so as to be extended backward. The outlet pipe 34 is provided at one end thereof with the opening portion 34b, and the opening portion 34b is interposed between the oxidation catalyst 4 and the particulate filter 1 in the anteroposterior direction, which forms an exhaust outlet. The posterior portion 34a of the outlet pipe 34 extended backward penetrates the central portion of the particulate filter 1 in the installation portion 41a, and the other end of the outlet pipe 34 is formed so as to be substantially located at the rear end of the particulate filter 1. A seal 36 is provided between a surface portion of the posterior portion 34a of the outlet pipe 34 penetrated into the particulate filter 1 and the particulate filter 1 facing with the surface portion, thereby preventing exhaust gas 10 from being discharged through a space between the posterior portion 34a of the outlet pipe 34 and the particulate filter 1.

Due to the above construction, exhaust gas 10 is introduced into the upstream spacial portion 42a provided at the upstream side of the oxidation catalyst 4 through the pores 6c on the inlet pipe 6. The exhaust gas 10 introduced from the pores 6c into the upstream spacial portion 42a flows to the oxidation catalyst 4. Then, exhaust gas 10 passes through the oxidation catalyst 4 and enters into the downstream spacial portion 42b. The exhaust gas 10 escapes from the vicinity of the midstream of the outlet pipe 34 in the downstream spacial portion 42 band passes through the outer peripheral side of the particulate filter 1 via the downstream spacial portion 42b (is purified by the particulate filter 1) so as to reach the spacial portion 23. The exhaust gas 10 enters from the spacial portion 23 into the outlet pipe 34 so as to be discharged from the outlet pipe 34.

As described above, even when the former portion of the black smoke exhaust purification apparatus does not have a structure as shown in the embodiment 6 and one as shown in the present embodiment, as the outlet pipe 34 penetrates the central portion of the particulate filter 1, the central portion of the particulate filter 1 that relatively easily accumulates the heat can be omitted, thereby enabling the equalization of the temperature of the particulate filter 1.

As is the case with the black smoke exhaust purification apparatus 60 as described in the embodiment 6, in the present embodiment, the particulate filter 1 can be removed from the installation portion 41a by only removing one belt 12 and without removing the flange of the exhaust gateway or the like, i.e., without removing the black smoke exhaust purification apparatus 60 from the supporting portion. The particulate filter 1 can be cleaned up at the central portion of the particulate filter 1 as the portion at which the outlet pipe 34 is removed.

Thus, the opening portion 34b as the outlet for exhaust gas 10 is interposed between the oxidation catalyst 4 and the particulate filter 1, and the outlet pipe 34 as the exhaust gas passage is extended from the opening portion 34b as the outlet portion for exhaust gas 10. The outlet pipe 34 passes through the particulate filter 1 and is connected to the downstream spacial portion 23 of the particulate filter 1. Accordingly, since the particulate filter 1 is formed as the torus-shape, and the central portion thereof that easily collects the heat is omitted, the temperatures of the particulate filter 1 are equalized. The opening portion 34b as the outlet for exhaust gas 10 can be provided at the center of side of the casing (the apparatus body), thereby improving the mounting performance for the black smoke exhaust purification apparatus (the after treatment device).

Embodiment 8

The embodiment 8 of the present invention will be described with reference to FIG. 8.

As shown in FIG. 8, the black smoke exhaust purification apparatus 80 is comprised of the inlet portion 2 and an outlet portion 43. The inlet portion 2 and the outlet portion 43 are formed in housings 7a, 47, respectively. The gasket 15 keeps airtightness between housings 7a and 47, and all of them are integrally fixed with the belt 12. The inlet portion 2 is arranged therein with the oxidation catalyst 4. The oxidation catalyst 4 is provided at the upstream side thereof with the upstream spacial portion 2a while the oxidation catalyst 4 is provided at the downstream side thereof with the downstream spacial portion 2b. The space 2c is provided between the outer peripheral portion of the oxidation catalyst 4 and the inside of the housing 7a, and the rear end of the space 2c is sealed with the partition wall 11. Thus, the space 2c forms the exhaust gas passage for introducing exhaust gas 10 into the upstream spacial portion 2a. The inlet portion 2 is provided at the outer peripheral portion thereof with the adiabatic acoustic material 8, which is pressed on an inner wall of the inlet portion 2 at the adiabatic acoustic material holding member 13 and the inner wall portion 17.

The outlet portion 43 is arranged at the anterior portion therein with the particulate filter 1. The particulate filter 1 is provided at the upstream side thereof with the upstream spacial portion 43a while the particulate filter 1 is provided at the downstream side thereof with the downstream spacial portion 43b. The space 43c is provided between the outer peripheral portion of the particulate filter 1 and the inside of the housing 47, and the front end of the space 43c is sealed with the partition wall 31. Thus, the space 43c forms the exhaust gas passage for discharging exhaust gas 10. The outlet portion 43 is provided at the outer peripheral portion thereof with the adiabatic acoustic material 8, which is pressed on an inner wall of the outlet portion 43 at an adiabatic acoustic material holding member 53 and an inner wall portion 67.

The particulate filter 1 is removable in the outlet portion 43.

The inlet portion 2 is provided with an inlet pipe 6 for introducing exhaust gas 10 from an engine (not shown) as an exhaust gas passage. The inlet pipe 6 is connected and fixed to an opening provided at the lower back portion of the inlet portion 2 so as to be continuously connected to the space 2c in the inlet portion 2. The inlet pipe 6 is provided at one end thereof with the opening portion 6b so as to connect to the engine through the exhaust pipe (not shown), and the opening portion 6b becomes the exhaust inlet. The exhaust gas 10 enters into the upstream spacial portion 2a of the inlet portion 2 through the inlet pipe 6 and the peripheral portion space 2c.

The outlet portion 43 is provided therein with an outlet pipe 44 as the exhaust gas passage for discharging exhaust gas 10. The outlet pipe 44 is connected and fixed to an opening provided at the upper front portion of the outlet portion 43 so as to be continuously connected to the space 43c in the outlet portion 43. The outlet pipe 44 is provided at one end thereof with the opening portion 44a as the exhaust outlet. The exhaust gas 10 is discharged from the outlet pipe 44 of the outlet portion 43 through the particulate filter 1, the spacial portion 43b and the outer peripheral portion space 43c.

Due to the above construction, exhaust gas 10 enters into the space 2c on the peripheral side of the oxidation catalyst 4 and is introduced into the upstream spacial portion 2a provided upstream of the oxidation catalyst 4. Then, exhaust gas 10 introduced into the upstream spacial portion 2a, as shown in FIG. 8, mainly flows to the outer peripheral side of the oxidation catalyst 4. The exhaust gas 10 passes through the oxidation catalyst 4 and enters from the downstream spacial portion 2b into the upstream spacial portion 43a of the outlet portion 43. The exhaust gas 10 passes through (is purified by) the particulate filter 1 through the upstream spacial portion 43a so as to reach the downstream spacial portion 43b. The exhaust gas 10 is discharged from the outlet pipe 44 through the downstream spacial portion 43b and the space 43c at the outer peripheral portion of the particulate filter 1.

In this regard, the inlet portion 2 as the former portion of the black exhaust purification apparatus 80 of the present embodiment is the same as the inlet portion 2 as the former portion of the black smoke exhaust purification apparatus 40 as described in the embodiment 3, and it can introduce exhaust gas 10 to the oxidation catalyst 4 relatively equally or by slightly increasing the gas flow rate toward the outer peripheral portion.

Incidentally, each of the black smoke exhaust purification apparatuses as described in the embodiments 1 to 5 is comprised of the inlet portion 2, the particulate filter 1 and the outlet portion 3, and the particulate filter 1 and the outlet portion 3 provided backward are the same constructions throughout the embodiments. Instead of the particulate filter 1 and the outlet portion 3 provided backward as described in the embodiments 1 to 5, the outlet portion 43 as shown in the present embodiment may be attached to the black smoke exhaust purification apparatuses as described above.

In each of the black smoke exhaust purification apparatuses as described in the embodiment 6 or 7, instead of being comprised of the combination of the installation portion 41a and the outlet pipe 34, the black smoke exhaust purification apparatus may be comprised by applying the combination of the outlet portion 43 and the outlet pipe 44.

Thus, the particulate filter 1 is provided at the outer peripheral portion and the downstream side thereof with the spaces, and the outlet pipe 44 for exhaust gas 10 is continuously connected to the outer peripheral portion space 43c. The exhaust gas 10 is introduced from the downstream spacial portion 43b of the particulate filter 1 through the outer peripheral portion space 43c of the particulate filter 1 to the opening portion 44a as the outlet for exhaust gas 10. Accordingly, relatively more exhaust gas 10 flows to the outer peripheral portion of the particulate filter 1, and the temperatures of the filter 1 are equalized. The opening portion 44a as the outlet for exhaust gas 10 can be provided at the center of side of the casing (the apparatus body), thereby improving the mounting performance for the black smoke exhaust purification apparatus (the after treatment device).

Embodiment 9

The embodiment 9 of the present invention will be described with reference to FIG. 9.

As shown in FIG. 9, the black smoke exhaust purification apparatus 90 is comprised of the inlet portion 2 and an outlet portion 63. The inlet portion 2 and the outlet portion 63 are formed in housings 7a, 67, respectively. The gasket 15 keeps airtightness between housings 7a and 67, and all of them are integrally fixed with the V-shaped belt 12. The inlet portion 2 is arranged at the posterior portion therein with the oxidation catalyst 4. The oxidation catalyst 4 is provided at the upstream side thereof with the upstream spacial portion 2a while the oxidation catalyst 4 is provided at the downstream side thereof with the downstream spacial portion 2b. The space 2c is provided between the outer peripheral portion of the oxidation catalyst 4 and the inside of the housing 7a, and the rear end of the space 2c is sealed with the partition wall 11. Thus, the space 2c forms the exhaust gas passage for introducing exhaust gas 10 into the upstream spacial portion 2a. The inlet portion 2 is provided at the outer peripheral portion thereof with the adiabatic acoustic material 8, which is pressed on an inner wall of the inlet portion 2 at the adiabatic acoustic material holding member 13 and the inner wall portion 17.

The outlet portion 63 is arranged at the anterior portion therein with the particulate filter 1. The particulate filter 1 is provided at the upstream side thereof with the upstream spacial portion 63a while the particulate filter 1 is provided at the downstream side thereof with the downstream spacial portion 63b. The space between the outer peripheral side of the front end of the particulate filter 1 and the inside of the outlet portion 63 is sealed with a partition wall 41. A space 63c is provided between the outer peripheral portion of the particulate filter 1 and the inside of the housing 67, the front end of which is sealed with a partition wall 61. Thus, the space 63c forms the exhaust gas passage for discharging exhaust gas 10. The outlet portion 63 is provided at the rear side thereof with the adiabatic acoustic material 8, which is pressed on an inner wall of the outlet portion 63 at an adiabatic acoustic material holding member 77.

The particulate filter 1 is removable in the outlet portion 63.

The inlet portion 2 is provided with an inlet pipe 6 for introducing exhaust gas 10 from an engine (not shown) as an exhaust gas passage. The inlet pipe 6 is connected and fixed to an opening provided at the lower back portion of the inlet portion 2 so as to be continuously connected to the space 2c in the inlet portion 2. The inlet pipe 6 is provided at one end thereof with the opening portion 6b so as to connect to the engine through the exhaust pipe (not shown), and the opening portion 6b becomes the exhaust inlet. The exhaust gas 10 enters into the upstream spacial portion 2a of the inlet portion 2 through the inlet pipe 6 and the outer peripheral portion space 2c.

The outlet portion 63 is provided therein with an outlet pipe 44 as the exhaust gas passage for discharging exhaust gas 10. The outlet pipe 44 is connected and fixed to an opening provided at the upper side of the middle portion of the outlet portion 63 so as to be continuously connected to the space 63c in the outlet portion 63. The outlet pipe 44 is provided at one end thereof with the opening portion 44a as the exhaust outlet. The exhaust gas 10 is discharged from the outlet pipe 44 of the outlet portion 63 through the particulate filter 1, the spacial portion 63b and the outer peripheral portion space 63c. The particulate filter 1 is provided at the lower side thereof with a resonant tube 32 for reducing a noise at the time of discharging the exhaust gas. A space at the front side of the resonant chamber 32 becomes a resonant chamber 35. After exhaust gas 10 passes through the particulate filter 1, it is discharged from the outlet pipe 44 of the outlet portion 63 through the spacial portion 63b and the outer peripheral portion space 63c.

Due to the above construction, exhaust gas 10 enters into the outer peripheral portion space 2c of the oxidation catalyst 4 through the inlet pipe 6 and is introduced from the space 2c into the upstream spacial portion 2a at the upstream side of the oxidation catalyst 4. Then, as shown in FIG. 9, exhaust gas 10 introduced into the upstream spacial portion 2a mainly flows to the outer peripheral side of the oxidation catalyst 4. The exhaust gas 10 passes through the oxidation catalyst 4 and enters from the downstream spacial portion 2b into the upstream spacial portion 63a of the outlet portion 63. The exhaust gas 10 passes through (is purified by) the particulate filter 1 through the spacial portion 63a so as to reach the downstream spacial portion 63b. The exhaust gas 10 is discharged from the outlet pipe 44 through the downstream spacial portion 63b and the spacial portion 63c at the outer peripheral portion of the particulate filter 1.

In the present embodiment, the resonant chamber 35 is provided using the outer space of the particulate filter 1, thereby assuredly deadening the sound in a compact geometry.

Thus, the particulate filter is provided at the outer peripheral portion thereof with the space, which is provided thereon with the resonant chamber 35 for deadening the exhaust sound, whereby the resonant chamber 35 can be provided without loss of the apparatus in the length direction and the particulate filter 1 can serve as the silencer.

Embodiment 10

The embodiment 10 of the present invention will be described with reference to FIG. 10.

As shown in FIG. 10, in the present embodiment, an exhaust heater 50 is attached to the inlet portion 2 and the front end portion of the black smoke exhaust purification apparatus 40 is replaced with a removable cover portion 2e in the black smoke exhaust purification apparatus 40 as described in the embodiment 3. The coiled exhaust heater 51 for heating exhaust gas 10 flowing into the inlet portion 2 is arranged around the oxidation catalyst 4 in the inlet portion 2. The housing 7a and the gasket 15 keep the airtightness of the cover portion 2e, and all of them are integrally fixed with the V-shaped belt 12. Due to the above construction, a heating portion is located at a relatively large space, in the flowing direction of exhaust gas 10, so that exhaust gas 10 can be fully heated. The exhaust heater 51 can be removable by opening and closing the cover portion 2e without removing the flange portion at the gateway for exhaust gas, which is a connecting portion to the exhaust pipe (not shown) from the engine or the discharging pipe (not shown) to the outside, i.e., without removing the black smoke exhaust purification apparatus 40 from the supporting portion.

In this regard, the exhaust heater 51 or the cover portion 2e as described in the present embodiment is also applicable in the embodiments 4 and 5.

As mentioned above, since the exhaust heater 51 is disposed at the space between the outer peripheral portion and the upstream side of the oxidation catalyst 4, the exhaust temperature can be increased when it is not enough to regenerate the particulate filter 1. The exhaust heater can be attached to the relatively larger area at the outer peripheral portion, and a capacious heater can be installed.

Embodiment 11

The embodiment 11 of the present invention will be described with reference to FIG. 11.

As shown in FIG. 11, a black smoke exhaust purification apparatus 110 is comprised of an inlet portion 72 and an outlet portion 73. The outlet portion 73 has an anterior outlet portion 73a and the resonant chamber 35. The inlet portion 72 and the outlet portion 73 are formed in housings 45a, 45b, respectively. The gaskets 15 keep the airtightness between the housings 45a and 45b, and all of them are integrally fixed by bolt fastening. The inlet portion 72 is arranged at the anterior portion therein with the oxidation catalyst 4. The oxidation catalyst 4 is provided at the upstream side thereof with an upstream spacial portion 72a while the oxidation catalyst 4 is provided at the downstream side thereof with a downstream spacial portion 72b. A space 72c is provided between the outer peripheral portion of the oxidation catalyst 4 and the inside of the housing 45a, and the rear end of the space 72c is sealed with a partition wall 71. The oxidation catalyst 4 is arranged at the rear side thereof with the particulate filter 1 via the downstream spacial portion 72b. The particulate filter 1 is connected at the downstream side thereof to the anterior outlet portion 73a. The coiled exhaust heater 51 for heating exhaust gas 10 flowing into the inlet portion 72 is arranged around the oxidation catalyst 4 in the inlet portion 72. The inlet portion 72 of the black smoke exhaust purification apparatus 110 is provided at the front end portion thereof with the removable cover portion 72e, the airtightness of which is kept by the gasket 15, and is integrally fixed at the front end of the inlet portion 72 by the bolt fastening. Due to the above construction, a heating portion is located at a relatively larger space, in the flowing direction of exhaust gas 10, so that exhaust gas 10 can be fully heated. The exhaust heater 51 is removable by opening and closing the cover portion 72e without removing the exhaust flange, which is a connecting portion to the exhaust pipe (not shown) from the engine, i.e., without removing the black smoke exhaust purification apparatus 110 from the supporting portion. The inlet portion 72 is provided with the adiabatic acoustic material 8, which is pressed on an inner wall of the inlet portion 72 at the adiabatic acoustic material holding member 13 and the inner wall portion 17

The particulate filter 1 is removable in the rear portion of the inlet portion 72.

The inlet portion 72 is provided therein with the inlet pipe 6 as the exhaust gas passage for introducing exhaust gas 10 from the engine (not shown). The inlet pipe 6 is connected and fixed to an opening provided at the lower side of the middle portion of the inlet portion 72 so as to be continuously connected to the spacial portion 72c in the inlet portion 72. The inlet pipe 6 is provided at one end thereof with the opening portion 6b so as to connect to the engine through the exhaust pipe (not shown), and the opening portion 6b becomes the exhaust inlet. The exhaust gas 10 enters into the upstream spacial portion 72a of the inlet portion 2 through the inlet pipe 6 and the outer peripheral portion space 72c.

The outlet portion 73 includes the outlet pipe 44 for discharging exhaust gas 10. The outlet pipe 44 is connected and fixed to an opening provided at the upper portion of the outlet portion 73 and is continuously connected to the anterior outlet portion 73a.

The anterior outlet portion 73a is arranged at the rear side thereof with the resonant tube 32 for reducing a noise at the time of discharging exhaust gas. The space at which the resonant tube 32 is incorporated becomes the resonant chamber 35. The outer side of the resonant chamber 35 forms a side cover portion 46. The gasket 15 keeps the airtightness between the front end of the resonant chamber 35 and the anterior outlet portion 73a, and they are integrally fixed by the bolt fastening. The side cover portion 46 is removable by removing the bolt at the fastening portion. The exhaust gas 10 inflowing from the particulate filter 1 is discharged from the outlet pipe 44 through the anterior outlet portion 73a.

Due to the above construction, exhaust gas 10 enters from the inlet pipe 6 into the outer peripheral portion space 72c of the oxidation catalyst 4 and is introduced from the space 72c into the upstream spacial portion 72a provided upstream of the oxidation catalyst 4. At this time, exhaust gas 10 is heated due to the heater 51. The exhaust gas 10 introduced into the upstream spacial portion 72a, as shown in FIG. 11, mainly flows to the outer peripheral side in the oxidation catalyst 4. Then, exhaust gas 10 passes through the oxidation catalyst 4 and enters from the downstream spacial portion 72b into the particulate filter 1. The exhaust gas 10 passes through (is purified by) the particulate filter 1 and reaches the anterior outlet portion 73a. The exhaust gas 10 is discharged from the outlet pipe 44 through the anterior outlet portion 73a.

The particulate filter 1 is removable, by removing the bolt fixing between the front end of the resonant chamber 35 and the anterior outlet portion 73a and by removing the side cover portion 46 as well as by drawing backward a handle portion 1b of the particulate filter 1 in the anterior outlet portion 73a. The exhaust heater 51 is removable without removing the flange portion at the gateway for exhaust gas 10, which is a connecting portion to the exhaust pipe (not shown) from the engine or the discharging pipe (not shown) for exhaust gas 10, i.e., without removing the black smoke exhaust purification apparatus 110 from the supporting portion or the like. As is the case with the embodiment 10, the exhaust heater 51 is removable by opening and closing the cover portion 72e without removing the flange portion at the gateway for exhaust gas 10, which is a connecting portion to the exhaust pipe (not shown) from the engine or the discharging pipe (not shown) to the outside, i.e., without removing the black smoke exhaust purification apparatus 110 from the supporting portion or the like.

Thus, the black smoke exhaust purification apparatus 110 for the diesel engine is provided at the rear portion thereof with the side cover portion 46, and the particulate filter 1 is removable without removing the flange portion at the gateway for exhaust gas 10, thereby facilitating the maintenance in case of ash deposition.

The black smoke exhaust purification apparatus 110 for the diesel engine is provided at the front portion thereof with the cover portion 72e, and the exhaust heater 51 is removable without removing the flange portion at the gateway for exhaust gas 10, thereby facilitating the maintenance of the heater 51.

In this regard, the present embodiment is not only applied to the black smoke exhaust purification apparatus 110. The black smoke exhaust purification apparatus may be constructed by attaching the outlet portion 43 as shown in the embodiment 8 instead of the particulate filter 1 and the outlet portion provided backward in each of the black smoke exhaust purification apparatuses as described in the embodiments 1 to 5 and by providing the cover portion at the front portion or the side cover portion at the rear portion of the present embodiment so that the particulate filter 1 or the exhaust heater 51 may be removable without removing the flange portion at the gateway for exhaust gas 10.

In each of the black smoke exhaust purification apparatuses as described in the embodiments 6 or 7, the black smoke exhaust purification apparatus may be constructed by applying the combination of the outlet portion 43 and the outlet pipe 44 as shown in the present embodiment instead of the combination of the installation portion 41a and the outlet pipe 34 and by providing the cover portion at the front portion thereof or the side cover portion at the rear portion thereof of the present embodiment so that the particulate filter 1 or the exhaust heater 51 may be removable without removing the flange portion at the gateway for exhaust gas 10.

Each of the black smoke exhaust purification apparatuses as shown in the embodiments 8 and 9 as mentioned above is provided at the front portion thereof or at the rear portion thereof with the cover portion or the side cover portion, respectively, so that the particulate filter 1 or the exhaust heater 51 may be removable without removing the flange portion at the gateway for exhaust gas 10.

Embodiment 12

The embodiment 12 of the present invention will be described with reference to FIG. 12.

Since the black smoke exhaust purification apparatus 120 of the present embodiment has the same construction as the black smoke exhaust purification apparatus 110 as shown in the embodiment 11 except for the particulate filter 1, only modified portions will be described.

In the black smoke exhaust purification apparatus 110 as described in the embodiment 11 as described above, the oxidation catalyst 4 is provided at the posterior portion thereof with the particulate filter 1 through the downstream spacial portion 72b. In the present embodiment, the particulate filter 1 is extended backward further than one as shown in the embodiment 11, whereby a space 73c is provided between the outer peripheral side of the particulate filter 1 in the outlet portion 73 and the inside of the outlet portion 73, and a downstream spacial portion 73b is provided downstream of the particulate filter 1.

Due to the above construction, exhaust gas 10 enters into the space 72c at the outer peripheral side of the oxidation catalyst 4 and is introduced from the space 72c into the upstream spacial portion 72a at the upstream side of the oxidation catalyst 4. At this time, exhaust gas 10 is heated by the exhaust heater 51. The exhaust gas 10 introduced into the upstream spacial portion 72a, as shown in FIG. 12, mainly flows to the outer peripheral side of the oxidation catalyst 4. The exhaust gas 10 passes through the oxidation catalyst 4 and enters from the downstream spacial portion 72b into the particulate filter 1. The exhaust gas 10 passes through (is purified by) the particulate filter 1 so as to reach the downstream spacial portion 73b of the outlet portion 73. The exhaust gas 10 is discharged from the outlet pipe 44 through the downstream spacial portion 73b and the space 73c.

The particulate filter 1 is removable by removing the bolt fixing between the front end of the resonant chamber 35 and the anterior outlet portion 73a and by removing the side cover portion 46 as well as by drawing backward a handle portion 1b of the particulate filter 1 in the anterior outlet portion 73a. The exhaust heater 51 is removable without removing the flange portion at the gateway for exhaust gas 10, which is a connecting portion to the exhaust pipe (not shown) from the engine or the discharging pipe (not shown) for exhaust gas 10, i.e., without removing the black smoke exhaust purification apparatus 120 from the supporting portion or the like. As is the case with the embodiment 10, the exhaust heater 51 is removable by opening and closing the cover portion 72e without removing the flange portion at the gateway for exhaust gas 10, which is a connecting portion to the exhaust pipe (not shown) from the engine or the discharging pipe (not shown) to the outside, i.e., without removing the black smoke exhaust purification apparatus 120 from the supporting portion or the like.

INDUSTRIAL APPLICABILITY

The present invention is applicable in the black smoke exhaust purification apparatus for the diesel engine.

The invention claimed is:

1. A black exhaust purification apparatus for a diesel engine, comprising:
  a first housing having opposite first and second ends, and forming an inlet portion therein;
  an oxidation catalyst having opposite first and second ends, and disposed in the inlet portion so that the first housing has an upstream space therein between the first end of the first housing and the first end of the oxidation catalyst, and has an outer peripheral space therein around the oxidation catalyst between the first and second ends of the first housing;
  a particulate filter having opposite first and second ends, wherein the second end of the first housing is joined to the first end of the particulate filter so that the oxidation catalyst and the particulate filter are arranged in series so that exhaust gas discharged from the second end of the oxidation catalyst enters the particulate filter from the first end of the particulate filter and so that the direction of flowing from the first end of the particulate filter to the second end of the particulate filter corresponds to the direction of exhaust gas flowing from the first end of the oxidation catalyst, to the second end of the oxidation catalyst;
  a second housing having an outlet pipe and joined to the second end of the particulate filter so that the exhaust gas flows from the upstream space to the outlet pipe through the oxidation catalyst and the particulate filter; and
  an inlet pipe provided on an outer peripheral portion of the first housing between the first and second ends of the first housing so as to introduce exhaust gas from the diesel engine into the inlet portion in the first housing, wherein the inlet pipe has a distance from the first end of the oxidation catalyst toward the second end of the oxidation catalyst in the direction of exhaust gas flowing from the oxidation catalyst to the particulate filter so that exhaust gas is introduced into the upstream side space from the inlet pipe through the outer peripheral space.

2. The black exhaust purification apparatus for the diesel engine as set forth in claim 1, wherein a guide is provided so as to prevent exhaust gas introduced to the upstream space from unevenly flowing toward the central portion of the oxidation catalyst.

3. The black exhaust purification apparatus for the diesel engine as set in claim 1, wherein an exhaust heater is provided in the outer peripheral space and the upstream space.

4. The black exhaust purification apparatus for the diesel engine as set forth in claim 3, wherein the first end of the first housing can be opened to remove the exhaust heater from the first housing, and the first end of the first housing is covered.

* * * * *